(12) United States Patent
McLeod et al.

(10) Patent No.: US 10,414,086 B2
(45) Date of Patent: Sep. 17, 2019

(54) POLYETHYLENE FOR SUPERIOR SHEET EXTRUSION THERMOFORMING PERFORMANCE

(71) Applicant: FINA TECHNOLOGY, INC., Houston, TX (US)

(72) Inventors: Michael McLeod, Houston, TX (US); Mahesh Patkar, Houston, TX (US); Jon Tippet, League City, TX (US); Russell McDonald, Humble, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 484 days.

(21) Appl. No.: 15/149,985

(22) Filed: May 9, 2016

(65) Prior Publication Data

US 2016/0325486 A1 Nov. 10, 2016

Related U.S. Application Data

(60) Provisional application No. 62/158,327, filed on May 7, 2015.

(51) Int. Cl.

| | | |
|---|---|---|
| *B29C 51/02* | (2006.01) | |
| *C08F 10/02* | (2006.01) | |
| *B29B 11/10* | (2006.01) | |
| *B29B 11/14* | (2006.01) | |
| *B29B 11/06* | (2006.01) | |
| *B29C 55/12* | (2006.01) | |
| *C08J 5/18* | (2006.01) | |
| *B29C 51/00* | (2006.01) | |
| *B29C 51/26* | (2006.01) | |
| *B29K 23/00* | (2006.01) | |
| *B29K 105/00* | (2006.01) | |
| *B29C 48/00* | (2019.01) | |
| *B29C 48/07* | (2019.01) | |

(52) U.S. Cl.
CPC .............. *B29C 51/02* (2013.01); *B29B 11/06* (2013.01); *B29B 11/10* (2013.01); *B29B 11/14* (2013.01); *B29C 55/12* (2013.01); *C08F 10/02* (2013.01); *C08J 5/18* (2013.01); *B29C 48/0017* (2019.02); *B29C 48/0018* (2019.02); *B29C 48/022* (2019.02); *B29C 48/07* (2019.02); *B29C 51/002* (2013.01); *B29C 51/265* (2013.01); *B29K 2023/065* (2013.01); *B29K 2023/0658* (2013.01); *B29K 2105/0067* (2013.01); *B29K 2105/0094* (2013.01); *B29K 2105/256* (2013.01); *B29K 2995/002* (2013.01); *B29K 2995/0041* (2013.01); *B29K 2995/0046* (2013.01); *B29K 2995/0063* (2013.01); *B29K 2995/0077* (2013.01); *B29K 2995/0088* (2013.01); *C08F 2500/05* (2013.01); *C08J 2323/06* (2013.01)

(58) Field of Classification Search
CPC ..... B29C 51/02; B29C 55/12; B29C 47/0019; B29C 47/0057; B29C 47/0054; B29C 47/0004; B29C 51/002; B29C 51/265; C08J 5/18; C08J 2323/06; B29B 11/14; B29B 11/06; B29B 11/10; C08F 10/02; C08F 2500/05; B29K 2105/256; B29K 2995/0077; B29K 2995/0046; B29K 2995/0041; B29K 2023/0658; B29K 2995/0088; B29K 2995/0063; B29K 2105/0094; B29K 2023/065; B29K 2995/002; B29K 2105/0067

See application file for complete search history.

(56) References Cited

U.S. PATENT DOCUMENTS

| | | |
|---|---|---|
| 3,663,663 A | 5/1972 | McAda |
| 4,800,129 A * | 1/1989 | Deak ............... B29C 51/002 428/474.4 |
| 5,618,908 A | 4/1997 | Vosa |
| 5,851,610 A | 12/1998 | Ristey et al. |

(Continued)

FOREIGN PATENT DOCUMENTS

| | | |
|---|---|---|
| CN | 101535030 A | 9/2009 |
| CN | 101573221 A | 11/2009 |

(Continued)

OTHER PUBLICATIONS

International Search Report and Written Opinion issued in PCT/US2016/031497, dated Aug. 16, 2016, 14 pages.
Office Action issued in Application No. CN 201680032199.3; dated Jan. 14, 2019, 18 pages.
Search Report issued in Application No. EP 16790232.9; dated Dec. 6, 2018; 10 pages.

*Primary Examiner* — Jeffrey M Wollschlager

(74) *Attorney, Agent, or Firm* — Albert Shung

(57) ABSTRACT

A method of forming a thermoformed article may include melt extruding polyethylene to form an extruded sheet. The rheological breadth parameter of the polyethylene may change by no more than about 5% after extrusion relative to the rheological breadth parameter of the polyethylene prior to extrusion. The extruded sheet may be thermoformed within a mold to form the thermoformed article. During thermoforming, the extruded sheet may be subjected to solid-state stretching in one or more directions. The thermoformed article may be retrieved from the mold. The polyethylene may have a rheological breadth parameter of from 0.20 to 0.40, a multimodal molecular weight distribution, a polydispersity (Mw/Mn) of from 5 to 18, a density ranging from 0.940 to 0.970 g/cc, may exhibit tensile strain-hardening, or combinations thereof.

23 Claims, 13 Drawing Sheets

(56) References Cited

U.S. PATENT DOCUMENTS

| | | | |
|---|---|---|---|
| 6,211,501 B1* | 4/2001 | McCarthy | B65D 1/34 |
| | | | 219/725 |
| 6,777,520 B2 | 8/2004 | McLeod et al. | |
| 8,846,841 B2 | 9/2014 | Yang et al. | |
| 2003/0236328 A1* | 12/2003 | McLeod | C08K 5/13 |
| | | | 524/115 |
| 2004/0019155 A1* | 1/2004 | McLeod | C08F 10/02 |
| | | | 525/333.8 |
| 2004/0236025 A1* | 11/2004 | DeKunder | B29C 49/0005 |
| | | | 525/240 |
| 2005/0239977 A1* | 10/2005 | McDaniel | C08F 10/02 |
| | | | 526/113 |
| 2006/0035087 A1 | 2/2006 | Yadav et al. | |
| 2007/0007680 A1* | 1/2007 | Henri Barre | B29C 47/0026 |
| | | | 264/40.1 |
| 2007/0007681 A1* | 1/2007 | Chevillard | B29C 47/0026 |
| | | | 264/40.1 |
| 2007/0125777 A1 | 6/2007 | Massop | |
| 2008/0114130 A1* | 5/2008 | Ashbaugh | C08L 23/06 |
| | | | 525/240 |
| 2008/0118692 A1* | 5/2008 | McLeod | B29D 23/001 |
| | | | 428/36.92 |
| 2009/0035546 A1* | 2/2009 | McLeod | C08J 5/18 |
| | | | 428/219 |
| 2009/0324911 A1* | 12/2009 | Li | B29C 47/0014 |
| | | | 428/213 |
| 2009/0326152 A1* | 12/2009 | Li et al. | C08L 23/10 |
| | | | 525/190 |
| 2010/0081767 A1* | 4/2010 | McLeod | C08K 5/0083 |
| | | | 525/192 |
| 2010/0129652 A1* | 5/2010 | McLeod | C08J 5/18 |
| | | | 428/340 |
| 2010/0159173 A1* | 6/2010 | Ashbaugh | C08K 5/0083 |
| | | | 428/36.9 |
| 2010/0203311 A1 | 8/2010 | Michie, Jr. | |
| 2012/0058324 A1 | 3/2012 | St Jean et al. | |
| 2013/0059100 A1* | 3/2013 | Hlavinka | C08F 110/02 |
| | | | 428/35.7 |
| 2013/0165590 A1* | 6/2013 | McLeod | C08L 23/06 |
| | | | 525/240 |
| 2013/0253121 A1* | 9/2013 | Li | B29C 45/0001 |
| | | | 524/502 |
| 2014/0213744 A1* | 7/2014 | Hlavinka | C08F 210/16 |
| | | | 526/113 |
| 2014/0256901 A1* | 9/2014 | Sukhadia | C08F 10/02 |
| | | | 526/348.3 |
| 2015/0259444 A1* | 9/2015 | Rohatgi | C08F 10/14 |
| | | | 526/348.5 |
| 2015/0259455 A1* | 9/2015 | Hlavinka | C08F 210/16 |
| | | | 526/114 |
| 2015/0290862 A1* | 10/2015 | Sun | B29C 49/06 |
| | | | 526/352 |

FOREIGN PATENT DOCUMENTS

| | | |
|---|---|---|
| CN | 101772540 A | 7/2010 |
| CN | 103635525 A | 3/2014 |
| EP | 0530782 A1 | 3/1993 |
| WO | 199006139 A1 | 6/1990 |
| WO | 2007050325 A2 | 5/2007 |
| WO | 2007118866 A1 | 10/2007 |
| WO | 2008061187 A1 | 5/2008 |
| WO | 2008064112 A1 | 5/2008 |
| WO | 2013009511 A1 | 1/2013 |
| WO | 2014060391 A1 | 4/2014 |

* cited by examiner

POLYETHYLENE FOR SUPERIOR SHEET EXTRUSION THERMOFORMING PERFORMANCE

CROSS-REFERENCE TO RELATED APPLICATIONS

This application claims priority from U.S. Provisional Application No. 62/158,327, filed on May 7, 2015, the entirety of which is incorporated herein by reference.

FIELD

Embodiments of the present disclosure generally relate to polymers for use in sheet extrusion thermoforming, methods of sheet extrusion thermoforming, and articles formed by sheet extrusion thermoforming.

BACKGROUND

Traditionally, during thermoforming of an extruded sheet, the extruded sheet is deformed at a temperature below its melting temperature, shaping the extruded sheet into a final desired shape within a mold. During thermoforming of an extruded sheet, solid-state stretching of the extruded sheet may occur. Thermoformed extruded sheets may be useful for production of a variety of articles, such as containers.

SUMMARY

The present disclosure provides for a method. The method includes melt extruding a polyethylene exhibiting a rheological breadth parameter of from 0.20 to 0.40, a multimodal molecular weight distribution, and a polydispersity (Mw/Mn) of from 5 to 18 to form an extruded sheet. A rheological breadth parameter of the polyethylene changes by no more than about 5% after extrusion relative to the rheological breadth parameter of the polyethylene prior to extrusion. The method includes thermoforming the extruded sheet of polyethylene within a mold. During the thermoforming of the extruded sheet, the extruded sheet is subjected to solid-state stretching in one or more directions. The method includes retrieving a thermoformed article from the mold.

The present disclosure provides for a thermoformed article formed by a method that includes melt extruding a polyethylene exhibiting a rheological breadth parameter of from 0.20 to 0.40, a multimodal molecular weight distribution, and a polydispersity (Mw/Mn) of from 5 to 18 to form an extruded sheet, thermoforming the extruded sheet of polyethylene within a mold, and retrieving the thermoformed article from the mold. A rheological breadth parameter of the polyethylene changes by no more than about 5% after extrusion relative to the rheological breadth parameter of the polyethylene prior to extrusion. During the thermoforming of the extruded sheet, the extruded sheet is subjected to solid-state stretching in one or more directions.

The present disclosure provides for a method. The method includes melt extruding a polyethylene that exhibits a multimodal molecular weight distribution, a density ranging from 0.940 to 0.970 g/cc as determined in accordance with ASTM D792, and tensile strain-hardening to form an extruded sheet. The method includes thermoforming the extruded sheet within a mold to form a thermoformed article. During the thermoforming of the extruded sheet, the extruded sheet is subjected to solid-state stretching in one or more directions. The method includes retrieving the thermoformed article from the mold.

The present disclosure provides for a method that includes melt extruding a polyethylene that exhibits a rheological breadth parameter of from 0.20 to 0.40, a polydispersity (Mw/Mn) of from 5 to 18, and a density ranging from 0.940 to 0.970 g/cc as determined in accordance with ASTM D792 to form an extruded sheet. The rheological breadth parameter of the polyethylene may change by no more than about 5% after extrusion relative to the rheological breadth parameter of the polyethylene prior to extrusion. The method includes thermoforming the extruded sheet within a mold to form a thermoformed article. During the thermoforming of the extruded sheet, the extruded sheet is subjected to solid-state stretching in one or more directions. The method includes retrieving the thermoformed article from the mold.

BRIEF DESCRIPTION OF DRAWINGS

The present disclosure may be understood from the following detailed description when read with the accompanying figures. It is emphasized that, in accordance with the standard practice in the industry, various features may not be drawn to scale. In fact, the dimensions of the various features may be arbitrarily increased or reduced for clarity of discussion.

DETAILED DESCRIPTION

Figure 1:
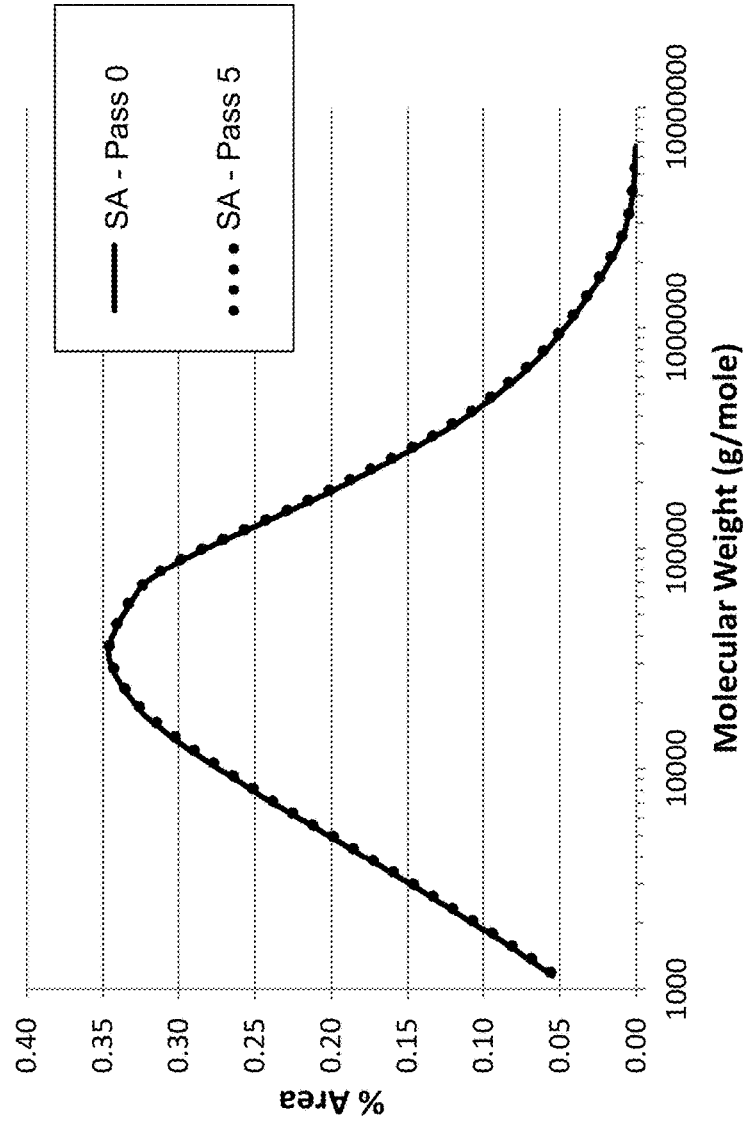
FIG. 1 is a graphical depiction of molecular weight versus percent area for a resin in accordance with Example 1.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology. In addition, the present disclosure may repeat reference numerals and/or letters in the various examples. This repetition is for the purpose of simplicity and clarity and does not in itself dictate a relationship between the various embodiments and/or configurations discussed.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Certain embodiments of the present disclosure relate to a method of forming an article from polyethylene. "Polyethylene" as used herein refers to polyethylene used in forming the article. For example and without limitation, the polyethylene may be a polyethylene that is catalyzed in the presence of a Zeigler-Natta catalyst (Zeigler-Natta catalyzed polyethylene), a single site catalyst such as a metallocene catalyst (metallocene catalyzed polyethylene), or a chromium based catalyst (chromium catalyzed polyethylene). The polyethylene may be formed in the presence of a catalyst in any one of a variety of processes including, but not limited to, solution phase, gas phase, slurry phase, bulk phase, high pressure processes or combinations thereof, for example.

Rheological breadth is a function of the relaxation time distribution of a polymer resin, which in turn is a function of a resin's molecular architecture. The rheological breadth parameter may be experimentally determined assuming Cox-Merz rule by fitting flow curves generated using linear-viscoelastic dynamic oscillatory frequency sweep experiments with a modified Carreau-Yasuda (CY) model, $$\eta = \eta_B [1 + (\lambda \gamma) \alpha]^{(n-1/\alpha)}$$

where:
$\eta$=viscosity (Pa s);
$\gamma$=shear rate (1/s);
$\alpha$=rheological breadth parameter [CY model parameter which describes the breadth of the transition region between Newtonian and power law behavior];
$\lambda$=relaxation time sec [CY model parameter which describes the location in time of the transition region];
$\eta_B$=Zero shear viscosity (Pa s) [CY model parameter which defines the Newtonian plateau]; and
n=power law constant [CY model parameter which defines the final slope of the high shear rate region].

To facilitate model fitting, the power law constant (n) may be held to a constant value (n=0).

In certain embodiments, the polyethylene may exhibit a zero shear viscosity (ZSV) of from 1000 Pa·sec to 50000 Pa·sec, from 2000 Pa·sec to 40000 Pa·sec, from 3000 Pa·sec to 30000 Pa·sec, from 4000 Pa·sec to 20000 Pa·sec, from 5000 Pa·sec to 10000 Pa·sec, from 6000 Pa·sec to 9000 Pa·sec, or from 7000 Pa·sec to 8000 Pa·sec.

The polyethylene may exhibit a relaxation time of from 0.001 seconds to 0.1 seconds, from 0.005 seconds to 0.09 seconds, from 0.009 seconds to 0.05, from 0.01 seconds to 0.1 seconds, from seconds from 0.008 seconds to 0.01 seconds, from 0.009 seconds to 0.0099 seconds, or from 0.0093 seconds to 0.0097 seconds.

The polyethylene may exhibit a rheological breadth parameter of from 0.20 to 0.40, or from 0.25 to 0.35, or from 0.27 to 0.33, or from 0.29 to 0.31.

The polyethylene may exhibit an activation energy ($E_a$) of from 20 to 30 kJ/mol, 22 to 28 kJ/mol, or 24 to 26 kJ/mol. As used herein, the ZSV, relaxation time, rheological breadth parameter, and activation energy are determined for a melt temperature of 190° C., as described in U.S. Pat. No. 6,777,520.

In certain embodiments, the polyethylene may exhibit thermal stability and good processability when subjected to solid-state stretching. For example and without limitation, thermal stability of the polyethylene may be exhibited by changes in the rheological breadth parameter of the polyethylene when the polyethylene is subjected to a single-pass or multi-pass extrusion test. For example, in multi-pass extrusion a polymer resin is subjected to multiple, sequential passes through an extruder. Without being bound by theory, it is believed that subjecting a polymer resin to passes through an extruder simulates accelerated aging of the polymer resin due to the elevated pressures and temperatures encountered by the polymer resin during extrusion. Also, without being bound by theory, it is believed that subjecting a polymer resin to passes through an extruder simulates reprocessing of regrind trim of the polymer in sheet extrusion thermoforming. In each pass of such an extrusion test, the polyethylene may be extruded through a slot or die at a temperature of about 250° C. The rheological breadth parameter of the polyethylene may change by no more than about 5%, or 4%, or 3%, or 2% after extrusion through a slot or die at a temperature of about 250° C., relative to the rheological breadth parameter of the polyethylene prior to any extrusion through a slot or die at a temperature of about 250° C. For example, if the rheological breadth parameter is 0.30 prior to extrusion, a change of 5% in the rheological breadth parameter after extrusion would result in a post-extrusion rheological breadth parameter of 0.315 or 0.285. In some embodiments, the rheological breadth parameter of the polyethylene may change by no more than about 5%, or 4%, or 3%, or 2% after 1, 2, 3, 4, or 5 extrusions through a slot or die at a temperature of about 250° C., relative to the rheological breadth parameter of the polyethylene prior to any extrusion through a slot or die at a temperature of about 250° C.

In certain embodiments, after 1, 2, 3, 4, or 5 extrusions of the polyethylene through a slot or die of an extruder at a temperature of about 250° C., the ZSV exhibited by the polyethylene may increase or decrease. For example and without limitation, after 1, 2, 3, 4, or 5 extrusions of the polyethylene through a slot or die of an extruder at a temperature of about 250° C., the ZSV of the polyethylene may change by less than 10%, less than 8%, or less than 6% relative to the ZSV of the polyethylene prior to any extrusions of the polyethylene through a slot or die of an extruder at a temperature of about 250° C.

In certain embodiments, after 1, 2, 3, 4, or 5 extrusions of the polyethylene through a slot or die of an extruder at a temperature of about 250° C., the relaxation time exhibited by the polyethylene may increase or decrease. For example and without limitation, after 1, 2, 3, 4, or 5 extrusions of the polyethylene through a slot or die of an extruder at a temperature of about 250° C., the relaxation time exhibited by the polyethylene may change by less than 10%, less than 8%, or less than 4% relative to the relaxation time of the polyethylene prior to any extrusions of the polyethylene through a slot or die of an extruder at a temperature of about 250° C.

In certain embodiments, after 1, 2, 3, 4, or 5 extrusions of the polyethylene through a slot or die of an extruder at a temperature of about 250° C., the activation energy ($E_a$) exhibited by the polyethylene may decrease. For example and without limitation, after 1, 2, 3, 4, or 5 extrusions of the polyethylene through a slot or die of an extruder at a temperature of about 250° C., the activation energy ($E_a$) exhibited by the polyethylene may change by less than 5%, less than 3%, or less than 2% relative to the activation energy ($E_a$) of the polyethylene prior to any extrusions of the polyethylene through a slot or die of an extruder at a temperature of about 250° C.

In certain embodiments, the polyethylene is a high density polyethylene (HDPE). The density of the HDPE may be from 0.940 to 0.970 g/cc, from 0.950 to 0.962 g/cc, or from 0.958 to 0.959 g/cc as determined in accordance with ASTM D792.

In certain embodiments, the polyethylene has a high load melt index (HLMI) that is greater than 50 g/10 min., greater than 60 g/10 min., greater than 70 g/10 min., greater than 80 g/10 min., greater than 90 g/10 min., greater than 100 g/10 min., greater than 115 g/10 min., greater than 120 g/10 min., greater than 125 g/10 min., greater than 130 g/10 min., less than 135 g/10 min., from 50 g/10 min. to 135 g/10 min., from 125 g/10 min. to 133 g/10 min., from 124 to 128 g/10 min., from 125 to 127 g/10 min., or about 126 g/10 min., as determined in accordance with ASTM-D-1238, at 190° C. and a load of 21.6 kg. In some embodiments, the HLMI of the polyethylene may change by no more than about 5%, or 4%, or 3%, or 2%, or 1% after 1, 2, 3, 4, or 5 extrusions through a slot or die at a temperature of about 250° C., relative to the HLMI of the polyethylene prior to any extrusion through a slot or die at a temperature of about 250° C.

The polyethylene may have an $MI_2$ of from 0.5 to 8.0 dg/min., 0.1 to 5.0 dg/min., from 1.0 to 5.0 dg/min., from 1.5 to 3.0 dg/min., from 2.2 to 2.5 dg/min., from 2.3 to 2.4 dg/min., or about 2.3 dg/min., as determined by ASTM D-1238 at 190° C. and a load of 2.16 kg. In some embodiments, the $MI_2$ of the polyethylene may change by no more than about 5%, or 4%, or 3% after 1, 2, 3, 4, or 5 extrusions through a slot or die at a temperature of about 250° C., relative to the $MI_2$ of the polyethylene prior to any extrusion through a slot or die at a temperature of about 250° C.

In some embodiments, prior to any extrusion of the polyethylene in an extruder, the polyethylene may exhibit a yellowness index (YI) of less than 1, from less than 0 to −5, from −1.5 to −2.5, or about −2, as measured in accordance with ASTM D-6290. In certain embodiments, after 1, 2, 3, 4, or 5 extrusions of the polyethylene through a slot or die of an extruder at a temperature of about 250° C., the YI may increase. For example and without limitation, after 1, 2, 3, 4, or 5 extrusions of the polyethylene through a slot or die of an extruder at a temperature of about 250° C., the YI may range from −1.5 to 3, or −1 to 2.5, −0.5 to 2.0, 0 to 1.5, or 0.5 to 1, as measured in accordance with ASTM D-6290.

In some embodiments, the polyethylene may exhibit a "Color L" of 60 to 90, 75 to 85, 80 to 82, greater than 80, or about 80, as measured in accordance with ASTM D-6290. In certain embodiments, after 1, 2, 3, 4, or 5 extrusions of the polyethylene through a slot or die of an extruder at a temperature of about 250° C., the Color L may decrease. For example and without limitation, after 1, 2, 3, 4, or 5 extrusions of the polyethylene through a slot or die of an extruder at a temperature of about 250° C., the Color L may be less than 80, or may range from 60 to 85, 70 to 80, 73 to 79, 74 to 78, or 75 to 77, as measured in accordance with ASTM D-6290.

In some embodiments, the polyethylene may exhibit a "Color a" of less than 2, less than 0, from 0 to −4, from −1 to −1.5, or about −1, as measured in accordance with ASTM D-6290. In certain embodiments, after 1, 2, 3, 4, or 5 extrusions of the polyethylene through a slot or die of an extruder at a temperature of about 250° C., the Color a may increase or decrease. For example and without limitation, after 1, 2, 3, 4, or 5 extrusions of the polyethylene through a slot or die of an extruder at a temperature of about 250° C., the Color a may be less than 2, less than 0, from 0 to −4, from −1.0 to −1.5, or −1.0 to −1.3, as measured in accordance with ASTM D-6290.

In some embodiments, the polyethylene may exhibit a "Color b" of less than 2, from −0.5 to 4, from 0 to −1, from −0.1 to −0.5, from −0.2 to −0.4, or about 0, as measured in accordance with ASTM D-6290. In certain embodiments, after 1, 2, 3, 4, or 5 extrusions of the polyethylene through a slot or die of an extruder at a temperature of about 250° C., the Color b may increase. For example and without limitation, after 1, 2, 3, 4, or 5 extrusions of the polyethylene through a slot or die of an extruder at a temperature of about 250° C., the Color b may be greater than −1, from −1 to 2, from −0.5 to 1.5, or from 0 to 1, as measured in accordance with ASTM D-6290.

The peak molecular weight (Mp) of the polyethylene may be less than 50,000 g/mol, less than 40,000 g/mol, or from greater than 30,000 g/mol to less than 35,000 g/mol, as determined by gel permeation chromatography (GPC). In some embodiments, the Mp of the polyethylene may change by no more than about 5%, or 4%, or 3% after 1, 2, 3, 4, or 5 extrusions through a slot or die at a temperature of about 250° C., relative to the Mp of the polyethylene prior to any extrusion through a slot or die at a temperature of about 250° C.

The number average molecular weight (Mn) of the polyethylene may be between 1,000 and 30,000 g/mol, between 2,000 and 20,000 g/mol, between 4,000 and 15,000 g/mol, between 7,000 and 12,000 g/mol, or between 10,000 and 11,000 g/mol, as determined by GPC. In some embodiments, the Mn of the polyethylene may change by no more than about 5%, or 4%, or 3%, or 2% after 1, 2, 3, 4, or 5 extrusions through a slot or die at a temperature of about 250° C., relative to the Mn of the polyethylene prior to any extrusion through a slot or die at a temperature of about 250° C.

The weight average molecular weight (Mw) of the polyethylene may be between 50,000 and 200,000 g/mol, between 60,000 and 160,000 g/mol, between 70,000 and 130,000 g/mol, between 80,000 and 120,000 g/mol, between 90,000 and 110,000 g/mol, or between 100,000 and 110,000 g/mol, as determined by GPC. In some embodiments, the Mw of the polyethylene may change by no more than about 5%, or 4%, or 3%, or 2% after 1, 2, 3, 4, or 5 extrusions through a slot or die at a temperature of about 250° C., relative to the Mw of the polyethylene prior to any extrusion through a slot or die at a temperature of about 250° C.

The z-average molecular weight (Mz) of the polyethylene may be between 500,000 and 3,000,000 g/mol, 600,000 and 2,000,000 g/mol, 700,000 and 1,000,000 g/mol, 710,000 and 800,000 g/mol, 720,000 and 780,000 g/mol, 730,000 and 770,000 g/mol, or 740,000 and 760,000 g/mol, as determined by GPC. In some embodiments, the Mz of the polyethylene may change by no more than about 5%, or 4%, or 3% after 1, 2, 3, 4, or 5 extrusions through a slot or die at a temperature of about 250° C., relative to the Mz of the polyethylene prior to any extrusion through a slot or die at a temperature of about 250° C.

In certain embodiments, the polydispersity (Mw/Mn) of the polyethylene may be from 5 to 18, from 6 to 14, 7 to 13, 8 to 12, 9 to 11, or 9 to 10. In some embodiments, the polydispersity of the polyethylene may change by no more than about 5%, or 4%, or 3%, or 2%, or 1% after 1, 2, 3, 4, or 5 extrusions through a slot or die at a temperature of about 250° C., relative to the polydispersity of the polyethylene prior to any extrusion through a slot or die at a temperature of about 250° C. In some embodiments, the polyethylene may exhibit an Mz/Mw of from 5 to 10, or 6 to 9, or 7 to 8, for example. In some embodiments, the Mz/Mw of the polyethylene may change by no more than about 5%, or 4%, or 3%, or 2%, or 1% after 1, 2, 3, 4, or 5 extrusions through a slot or die at a temperature of about 250° C., relative to the Mz/Mw of the polyethylene prior to any extrusion through a slot or die at a temperature of about 250° C.

In certain embodiments, the polyethylene exhibits a unimodal molecular weight distribution. In other embodiments, the polyethylene exhibits a multimodal molecular weight distribution, for example, a bimodal molecular weight distribution.

In certain embodiments, a compression molded specimen of the polyethylene exhibits tensile strength at break (psi) that is greater than the tensile strength at yield (psi) exhibited by the compression molded specimen of the polyethylene. Without being bound by theory, it is believed that increased tensile strength at break in comparison to tensile strength at yield of polyethylene is indicative of the ability of the polyethylene to strain-harden (e.g., tensile strain harden). As used herein, "strain-hardening" refers to an increase in strength (e.g., tensile strength) of a material or article (e.g., the polyethylene, extruded sheet, or thermoformed article) as a result of plastic deformation of the material or article. As used herein, "tensile strain-hardening" refers to an increase in tensile strength of a material or article (e.g., the polyethylene, extruded sheet, or thermoformed article) as a result of tensile plastic deformation of the material or article. The tensile strengths at break and yield may be determined in accordance with ASTM D638.

In some embodiments, a compression molded specimen of the polyethylene may exhibit a shear response that is greater than 40, greater than 45, greater than 50, greater than 55, from 40 to 70, from 50 to 60, from 52 to 58, from 54 to 56, or 55 as determined in accordance with ASTM D-3518. In certain embodiments, the shear response of a molten plaque of the polyethylene may change by no more than about 10%, or 7%, or 6% after extrusion through a slot or die at a temperature of about 250° C., relative to the shear response of a molten plaque of the polyethylene prior to any extrusion through a slot or die at a temperature of about 250° C. In some embodiments, the shear response of a molten plaque of the polyethylene may change by no more than about 10%, or 7%, or 6% after 1, 2, 3, 4, or 5 extrusions through a slot or die at a temperature of about 250° C., relative to the shear response of a molten plaque of the polyethylene prior to any extrusion through a slot or die at a temperature of about 250° C.

In some embodiments, the polyethylene may exhibit an Environmental Stress Crack Resistance (ESCR) that is greater than 30 hours, greater than 50 hours, greater than 60 hours, greater than 70 hours, greater than 80 hours, greater than 90 hours, greater than 100 hours, or from 45 to 80 hours, as determined in accordance with ASTM D-1693 Condition B, F50. In some embodiments, after 1, 2, 3, 4, or 5 extrusions of the polyethylene through a slot or die of an extruder at a temperature of about 250° C., the ESCR may increase or decrease. For example and without limitation, after 1, 2, 3, 4, or 5 extrusions of the polyethylene through a slot or die of an extruder at a temperature of about 250° C., the ESCR of the polyethylene may change by from 10 to 50%, from 20 to 40%, or from 20 to 25% relative to the ESCR of the polyethylene prior to any extrusions.

In some embodiments, the polyethylene may exhibit a crystallization temperature of from about 100° C. to 135° C., or 110° C. to 125° C., 115° C. to 120° C., or 117.0 to 118.0° C., as determined by Differential Scanning calorimetry (DSC) in accordance with ASTM D-3418D. In certain embodiments, the crystallization temperature of the polyethylene may change by less than less 2° C., or from 0.6 to 1° C., or from 0.8 to 1° C. after 1, 2, 3, 4, or 5 extrusions through a slot or die at a temperature of about 250° C., relative to the crystallization temperature of the polyethylene prior to any extrusion through a slot or die at a temperature of about 250° C. In some embodiments, after testing the crystallization temperature of the polyethylene, the polyethylene may be tested again to determine a second melt temperature of the polyethylene. In certain embodiments, the polyethylene may exhibit a second melt temperature of from about 125° C. to 135° C., or 130° C. to 134° C., or 132° C. to 133° C. as determined by Differential Scanning calorimetry (DSC) in accordance with ASTM D-3418D. In certain embodiments, the second melt temperature of the polyethylene may change by less than less 1° C., less than 0.7° C., or by from 0.1 to 0.6° C. after 1, 2, 3, 4, or 5 extrusions through a slot or die at a temperature of about 250° C., relative to the second melt temperature of the polyethylene prior to any extrusion through a slot or die at a temperature of about 250° C.

In certain embodiments, the polyethylene may exhibit a crystallization enthalpy of from 170 to 215 J/g, 195 to 205 J/g, 198 to 202 J/g, or 199.0 to 201.5 J/g, as determined by DSC in accordance with ASTM D-3418D. In certain embodiments, the crystallization enthalpy of the polyethylene may change by less than 2%, less 1%, or by from 0 to 1% after 1, 2, 3, 4, or 5 extrusions through a slot or die at a temperature of about 250° C., relative to the crystallization enthalpy of the polyethylene prior to any extrusion through a slot or die at a temperature of about 250° C. In some embodiments, after testing the crystallization enthalpy of the polyethylene, the polyethylene may be tested again to determine a second melt enthalpy of the polyethylene. In certain embodiments, the polyethylene may exhibit a second melt enthalpy of from about 170° C. to 215° C., or 200° C. to 205° C., or 203° C. to 204° C., as determined by Differential Scanning calorimetry (DSC) in accordance with ASTM D-3418D. In certain embodiments, the second melt enthalpy of the polyethylene may change by less than less 2%, less than 1.5%, or by from 1 to 2% after 1, 2, 3, 4, or 5 extrusions through a slot or die at a temperature of about 250° C., relative to the second melt enthalpy of the polyethylene prior to any extrusion through a slot or die at a temperature of about 250° C.

In certain embodiments, a compression molded sample of the polyethylene may exhibit a tensile modulus of from 160,000 to 220,000 psi, 185,000 to 200,000 psi, or 190,000 to 195,000 psi, or about 194,000 psi, as determined in accordance with ASTM D638. In some embodiments, a 12 mil cast sheet of the polyethylene may exhibit a tensile modulus in the machine direction of from 170,000 to 200,000 psi, 180,000 to 190,000 psi or about 186,000 psi, as determined in accordance with ASTM D638. In some embodiments, a 12 mil cast sheet of the polyethylene may exhibit a tensile modulus in the transverse direction of from 160,000 to 200,000 psi, or 170,000 to 180,000 psi, or about 175,000 psi, as determined in accordance with ASTM D638. In some embodiments, a 16 mil cast sheet of the polyethylene may exhibit a tensile modulus in the machine direction of from 180,000 to 210,000 psi, 200,000 to 207,000 psi or about 205,000 psi, as determined in accordance with ASTM D638. In some embodiments, a 16 mil cast sheet of the polyethylene may exhibit a tensile modulus in the transverse direction of from 190,000 to 200,000 psi, or 193,000 to 197,000 psi, or about 195,000 psi, as determined in accordance with ASTM D638. In some embodiments, a 20 mil cast sheet of the polyethylene may exhibit a tensile modulus in the machine direction of from 210,000 to 220,000 psi, 213,000 to 217,000 psi, or about 215,000 psi, as determined in accordance with ASTM D638. In some embodiments, a 20 mil cast sheet of the polyethylene may exhibit a tensile modulus in the transverse direction of from 190,000 to 200,000 psi, or 192,000 to 198,000 psi, or about 197,000 psi, as determined in accordance with ASTM D638.

In some embodiments, a compression molded sample of the polyethylene may exhibit a tensile strength at yield ranging from 3500 to 5000 psi, or from 3800 to 4500 psi, or from 4000 to 4400 psi, or from 4250 to 4350 psi, or about 4300 psi, as determined in accordance with ASTM D638. In some embodiments, a 12 mil cast sheet of the polyethylene may exhibit a tensile strength at yield in the machine direction ranging from 3900 to 4000 psi, or from 3950 to 3970 psi, or about 4000 psi as determined in accordance with ASTM D638. In some embodiments, a 12 mil cast sheet of the polyethylene may exhibit a tensile strength at yield in the transverse direction ranging from 3700 to 3800 psi, or from 3720 to 3760 psi, or about 3700 psi as determined in accordance with ASTM D638. In some embodiments, a 16 mil cast sheet of the polyethylene may exhibit a tensile strength at yield in the machine direction ranging from 4000 to 4150 psi, or from 4050 to 4100 psi, or about 4100 psi as determined in accordance with ASTM D638. In some embodiments, a 16 mil cast sheet of the polyethylene may exhibit a tensile strength at yield in the transverse direction ranging from 3800 to 3900 psi, or from 3820 to 3890 psi, or about 3800 psi as determined in accordance with ASTM D638. In some embodiments, a 20 mil cast sheet of the polyethylene may exhibit a tensile strength at yield in the machine direction ranging from 4050 to 4250 psi, or from 4100 to 4200 psi, or about 4100 psi as determined in accordance with ASTM D638. In some embodiments, a 20 mil cast sheet of the polyethylene may exhibit a tensile strength at yield in the transverse direction ranging from 3800 to 4100 psi, or from 3900 to 4000 psi, or about 4000 psi as determined in accordance with ASTM D638.

In some embodiments, a compression molded sample of the polyethylene may exhibit a tensile strength at break of greater than 3000 psi, or ranging from 3000 to 8000 psi, or from 4100 to 4500 psi, or from 4200 to 4400 psi, or from 4300 to 4350 psi, or about 4300 psi, as determined in accordance with ASTM D638. In some embodiments, a 12 mil cast sheet of the polyethylene may exhibit a tensile strength at break in the machine direction ranging from 4000 to 7000 psi, 5000 to 6000 psi, or about 5000 psi as determined in accordance with ASTM D638. In some embodiments, a 12 mil cast sheet of the polyethylene may exhibit a tensile strength at break in the transverse direction ranging from 3000 to 5000 psi, or from 3050 to 4050 psi, or about 4300 psi as determined in accordance with ASTM D638. In some embodiments, a 16 mil cast sheet of the polyethylene may exhibit a tensile strength at break in the machine direction ranging from 4000 to 6000 psi, or from 4050 to 5050 psi, or about 5000 psi as determined in accordance with ASTM D638. In some embodiments, a 16 mil cast sheet of the polyethylene may exhibit a tensile strength at break in the transverse direction ranging from 3000 to 5000 psi, or from 3500 to 4500 psi, or about 4400 psi as determined in accordance with ASTM D638. In some embodiments, a 20 mil cast sheet of the polyethylene may exhibit a tensile strength at break in the machine direction ranging from 3000 to 5000 psi, or from 3500 to 4500 psi, or about 3600 psi as determined in accordance with ASTM D638. In some embodiments, a 20 mil cast sheet of the polyethylene may exhibit a tensile strength at break in the transverse direction ranging from 3000 to 5000 psi, or from 3500 to 4500 psi, or about 4000 psi as determined in accordance with ASTM D638.

In some embodiments, a compression molded sample of the polyethylene may exhibit an elongation at yield of from 3 to 10%, or 4 to 8%, or 6 to 6.5%, as determined in accordance with ASTM D638. In some embodiments, a 12 mil cast sheet of the polyethylene may exhibit an elongation at yield in the machine direction of from 4 to 5%, 4.2 to 4.8%, or about 4.8%, as determined in accordance with ASTM D638. In some embodiments, a 12 mil cast sheet of the polyethylene may exhibit an elongation at yield in the transverse direction of from 4.5 to 5.5%, 4.7 to 5.3%, or about 5.2% as determined in accordance with ASTM D638. In some embodiments, a 16 mil cast sheet of the polyethylene may exhibit an elongation at yield in the machine direction of from 4.5 to 5.5%, 4.8 to 5.2%, or about 5.1%, as determined in accordance with ASTM D638. In some embodiments, a 16 mil cast sheet of the polyethylene may exhibit an elongation at yield in the transverse direction of from 5 to 6%, 5.3 to 5.7%, or about 5.6% as determined in accordance with ASTM D638. In some embodiments, a 20 mil cast sheet of the polyethylene may exhibit an elongation at yield in the machine direction of from 4.5 to 5.5%, 4.7 to 5.3%, or about 5.2%, as determined in accordance with ASTM D638. In some embodiments, a 20 mil cast sheet of the polyethylene may exhibit an elongation at yield in the transverse direction of from 5 to 7%, 5.5 to 6.5%, or about 6% as determined in accordance with ASTM D638.

In certain embodiments, a 12 mil cast sheet of the polyethylene exhibits a maximum tensile stress in the machine direction of from 4000 to 6000 psi, 4500 to 5500 psi, or about 5100 psi, as determined in accordance with ASTM D638. In certain embodiments, a 12 mil cast sheet of the polyethylene exhibits a maximum tensile stress in the transverse direction of from 3000 to 5000 psi, 3500 to 4500 psi, or about 4300 psi, as determined in accordance with ASTM D638. In certain embodiments, a 16 mil cast sheet of the polyethylene exhibits a maximum tensile stress in the machine direction of from 4000 to 6000 psi, 4500 to 5500 psi, or about 5000 psi, as determined in accordance with ASTM D638. In certain embodiments, a 16 mil cast sheet of the polyethylene exhibits a maximum tensile stress in the transverse direction of from 3000 to 5000 psi, 3500 to 4500 psi, or about 4400 psi, as determined in accordance with ASTM D638. In certain embodiments, a 20 mil cast sheet of the polyethylene exhibits a maximum tensile stress in the machine direction of from 4000 to 6000 psi, 4500 to 5500 psi, or about 4500 psi, as determined in accordance with ASTM D638. In certain embodiments, a 20 mil cast sheet of the polyethylene exhibits a maximum tensile stress in the transverse direction of from 3000 to 5000 psi, 3500 to 4500 psi, or about 4300 psi, as determined in accordance with ASTM D638.

In certain embodiments, a 12 mil cast sheet of the polyethylene may exhibit shrinkage in the machine direction of from 20 to 60%, 30 to 50%, or about 46%. In certain embodiments, a 12 mil cast sheet of the polyethylene may exhibit shrinkage in the transverse direction of from −10 to 10%, −5 to 5%, or about −1%. In certain embodiments, a 16 mil cast sheet of the polyethylene may exhibit shrinkage in the machine direction of from 20 to 60%, 30 to 50%, or about 38%. In certain embodiments, a 16 mil cast sheet of the polyethylene may exhibit shrinkage in the transverse direction of from 0 to 10%, 3 to 7%, or about 1%. In certain embodiments, a 20 mil cast sheet of the polyethylene may exhibit shrinkage in the machine direction of from 20 to 60%, 25 to 45%, or about 28%. In certain embodiments, a 20 mil cast sheet of the polyethylene may exhibit shrinkage in the transverse direction of from 0 to 10%, 3 to 7%, or about 1%.

In certain embodiments, the method includes forming a thermoformed article with polyethylene in place of polypropylene. The polyethylene may be a polyethylene that exhibits a melt index ($MI_2$) and melt rheology that is the same as, similar to, or substantially similar to that of a polypropylene that is conventionally used for sheet extrusion thermoforming, thus allowing the polyethylene to be commercially processed into thermoformed articles at viable production rates. Polyethylene typically has a broader recycling stream in comparison with polypropylene, which may aid in market acceptance and commercial utility in comparison to sheet extrusion thermoforming of polypropylene.

In certain embodiments, the polyethylene includes one or more additives. The one more additives may include nucleators, clarifiers, antioxidants, colorants, UV absorbers, stabilizers, or processing aids, for example. The nucleator may be any nucleator known to one skilled in the art for modifying olefin based polymers. For example and without limitation, the nucleator be a metal salt, such as HYPERFORM® HPN-20E, commercially available from Milliken Chemical. Other additives suitable for use herein include, for example and without limitation, stabilizers, such as IRGANOX® B-215, IRGANOX® 168 and IRGANOX® 1010 available from BASF™; calcium stearate; antioxidants, such as ULTRANOX® 627AV available from ADDIVANT™; and processing aids, such as VITON® Free Flow SAR-7468, and VITON®Z110, both available from DUPONT®. IRGANOX® B-215 is a blend of 67 weight percent IRGANOX® 168 and 33 weight percent IRGANOX® 1010. In certain embodiments, the polyethylene includes no additives. In certain embodiments, the polyethylene includes no nucleator.

The method may include thermoforming an initial article that is formed of polyethylene. For example and without limitation, the initial article may be an extruded sheet or film that is formed of polyethylene. Thermoforming the initial article may include subjecting the initial article to heat, vacuum or pressure, or combinations thereof to convert the initial article into a thermoformed article. For example and without limitation, the initial article may be placed into a mold. The initial article within the mold may be subjected to heat, vacuum or pressure, or combinations thereof, causing the initial article to conform to the shape of interior walls of the mold. In some embodiments, the initial article may be heated prior to being placed in the mold. The heated initial article may then be placed into the mold, the mold may be closed onto the initial article, and a vacuum or pressure may then be applied to the mold. Application of the vacuum or pressure to the heated initial article within the mold causes the initial article to conform to the shape of the interior of the mold, thus forming the thermoformed article.

In certain embodiments, the method may include forming the initial article prior to thermoforming the initial article. In some embodiments, the initial article is formed by extrusion. In such embodiments, the method may be a sheet extrusion thermoforming method including at least two steps. For example and without limitation, sheet extrusion thermoforming may include melt extrusion of the polyethylene to form the initial article, followed by thermoforming of the initial article to form the thermoformed article. In some embodiments, formation of the initial article may include extruding molten polyethylene through a slot or die to form an extruded sheet. Extrusion of the molten polyethylene may occur at a temperature ranging from 150° C. to 275° C., 160° C. to 250° C., 175° C. to 225° C., 200° C. to 215° C., 250° C. to 260° C., for example. The extruded sheet may then be thermoformed in a mold, as described herein. For example, molten polyethylene may be extruded through a slot or die with one or more orifices arranged such that an extruded sheet that includes one or more layers is formed. In certain embodiments, the extruded sheet may have a thickness ranging from about 10 to 100 mil, 12 to 20 mil, 12 to 16 mil, or 16 to 20 mil. In some embodiments, each layer of a multilayer extruded sheet may have a thickness ranging from about 0.5 to 90 mil, 1.5 to 30 mil, 2 to 25 mil or 5 to 20 mil. In some embodiments, the molten polyethylene may exit through the slot or die as a molten plaque that may be used to form a cast sheet or an oriented sheet. For example and without limitation, the molten plaque may exit through the slot or die and be uniaxially or biaxially stretched while being taken up onto a chill roller where it is cooled to produce a cast film.

In certain embodiments, thermoforming the initial article subjects the initial article to solid-state stretching. For example and without limitation, after extrusion to form an extruded sheet of polyethylene, the extruded sheet may be cooled to a solid state, such as by quenching. The cooled, extruded sheet of polyethylene may then be reheated and thermoformed within a mold. During thermoforming, subjection of the extruded sheet to heat, vacuum or pressure, or combinations thereof causes the extruded sheet to conform to the shape of the interior of the mold. During the conforming of the extruded sheet to the shape of the interior of the mold, the extruded sheet may undergo solid-state stretching in one or more directions, thus forming a solid-state stretched, thermoformed article from the extruded sheet. In some embodiments, the extruded sheet may be subjected to solid-state stretching (uniaxial or biaxial) at a strain rate of 25%/s or greater, or 50%/s or greater, or 100%/s or greater, or 200%/s or greater, or 400%/s or greater, for from 6%/s to 1000%/s. In certain embodiments, the extruded sheet may be subjected to solid-state stretching (uniaxial or biaxial) at a stretch ratio of 2×2 or greater, 3×3 or greater, 4×4 or greater, or from 2×2 to 4×4. In some embodiments, the extruded sheet may be subjected to solid-state stretching (uniaxial or biaxial) at a temperature ranging from 120° C. to 150° C., or 130° C. to 140° C.

In some embodiments, certain stretching properties of the polyethylene may be determined by subjecting a cast sheet of the polyethylene to biaxial stretching, such as in a Bruckner Biaxial Stretcher. Machine and transverse stresses may be estimated by normalizing the load by the initial (un-stretched) cast sheet thickness. The "ultimate effective stress" as used herein is defined as the maximum effective stress exhibited during stretching of a cast sheet. The "biaxial effective stress" as used herein is defined as a combination of stresses in the machine and transverse directions (i.e., a von Mises stress) with the following mathematical relationship (Equation (1)):

$$\text{Bi-Axial Effective Stress: } \sigma_{eq} = \sqrt{\sigma_L^2 - \sigma_L \sigma_T + \sigma_T^2} \quad (1)$$

In Equation (1), $\sigma_{eq}$ is bi-axial effective stress, $\sigma_L$ is the machine direction stress (i.e., longitudinal stress), and $\sigma_T$ is the transverse direction stress.

Similarly, strain may be estimated by normalizing the stretching length by the initial (un-stretched) length of a cast sheet. The machine and transverse strains may be directly calculated. The effective stiffness may be calculated from the maximum slope of biaxial effective stress versus biaxial effective strain. The "biaxial effective strain" as used herein is defined to be the work conjugate of biaxial effective stress in accordance with Equation (2): Bi-Axial Effective Strain:

$$\varepsilon_{eq} = \sqrt{\frac{4}{3}(\varepsilon_L^2 + \varepsilon_L \varepsilon_T + \varepsilon_T^2)} \quad (2)$$

In Equation (2), $\varepsilon_{eq}$ is bi-axial effective strain, $\varepsilon_L$ is the machine direction strain (i.e., longitudinal strain), and $\varepsilon_T$ is the transverse direction strain.

Without being bound by theory, as a first approximation the energy balance of heat absorbed by a cast sheet to heat supplied by the heating atmosphere (ignoring radiation) during stretching may be considered. Neglecting temperature difference through the cast sheet, losses due to clamps of the Bruckner Biaxial Stretcher, and air flow, the energy balance of the cast sheet may take the following format as set forth in Equation (3):

$$\rho c z \frac{d}{dt}(T) = h(T_\infty - T) \quad (3)$$

In Equation (3), $\rho$ is density (kg/m$^3$) of the cast sheet, c is heat capacity (J/kg-K) of the cast sheet, z is thickness (m) of the cast sheet, t is time (s), T is temperature (K) at time t, h is heat transfer coefficient (W/m$^2$-K), and $T_\infty$ is the temperature of the oven (K) of the Bruckner Biaxial Stretcher. Equation (3) can be solved by separation of variables, the solution of which is Equation (4):

$$T = T_\infty - (T_\infty - T_o)e^{-\frac{h}{\rho c}\frac{t}{z}} \quad (4)$$

In Equation (4), $T_0$ is the initial temperature of the cast sheet (K). As is evident from Equation (4), the overall temperature is dependent on the ratio of preheat time to cast sheet thickness.

In some embodiments, a 12 mil cast sheet of the polyethylene may exhibit a stiffness in the machine direction during biaxial stretching ranging from −10 to 110 psi, 0 to 100 psi, 10 to 90 psi, 20 to 80 psi, 30 to 70 psi, or 40 to 60 psi. In some embodiments, a 12 mil cast sheet of the polyethylene may exhibit a stiffness in the transverse direction during biaxial stretching ranging from −10 to 200 psi, 20 to 180 psi, 40 to 160 psi, 60 to 140 psi, 80 to 120 psi. In some embodiments, a 12 mil cast sheet of the polyethylene may exhibit a biaxial effective stiffness during biaxial stretching ranging from 0 to 70 psi, 10 to 60 psi, 20 to 50 psi, 30 to 40 psi.

In some embodiments, a 16 mil cast sheet of the polyethylene may exhibit a stiffness in the machine direction during biaxial stretching ranging from 10 to 100 psi, 20 to 80 psi, or 40 to 60 psi. In some embodiments, a 16 mil cast sheet of the polyethylene may exhibit a stiffness in the transverse direction during biaxial stretching ranging from −10 to 90 psi, 10 to 70 psi, or 30 to 50 psi. In some embodiments, a 16 mil cast sheet of the polyethylene may exhibit an effective stiffness during biaxial stretching ranging from 0 to 50 psi, 10 to 40 psi, or 20 to 30 psi.

In some embodiments, a 20 mil cast sheet of the polyethylene may exhibit a stiffness in the machine direction during biaxial stretching ranging from 20 to 150 psi, 30 to 140 psi, 40 to 130 psi, 50 to 120 psi, 60 to 120 psi, 70 to 110 psi, or 80 to 100 psi. In some embodiments, a 20 mil cast sheet of the polyethylene may exhibit a stiffness in the transverse direction during biaxial stretching ranging from −10 to 60 psi, 0 to 50 psi, 10 to 40 psi, or 20 to 30 psi. In some embodiments, a 20 mil cast sheet of the polyethylene may exhibit an effective stiffness during biaxial stretching ranging from 10 to 80 psi, 20 to 70 psi, or 30 to 60 psi.

In some embodiments, a 12 mil cast sheet of the polyethylene may exhibit a stress at yield in the machine direction during biaxial stretching ranging from 0 to 10 psi, 2 to 8 psi, or 4 to 6 psi. In some embodiments, a 12 mil cast sheet of the polyethylene may exhibit a stress at yield in the transverse direction during biaxial stretching ranging from 0 to 10 psi, 2 to 8 psi, or 4 to 6 psi. In some embodiments, a 12 mil cast sheet of the polyethylene may exhibit a biaxially effective stress at yield during biaxial stretching ranging from 0 to 10 psi, 2 to 8 psi, or 4 to 6 psi.

In some embodiments, a 16 mil cast sheet of the polyethylene may exhibit a stress at yield in the machine direction during biaxial stretching ranging from 0 to 10 psi, 2 to 8 psi, or 4 to 6 psi. In some embodiments, a 16 mil cast sheet of the polyethylene may exhibit a stress at yield in the transverse direction during biaxial stretching ranging from 0 to 10 psi, 2 to 8 psi, or 4 to 6 psi. In some embodiments, a 16 mil cast sheet of the polyethylene may exhibit a biaxially effective stress at yield during biaxial stretching ranging from 0 to 10 psi, 2 to 8 psi, or 4 to 6 psi.

In some embodiments, a 20 mil cast sheet of the polyethylene may exhibit a stress at yield in the machine direction during biaxial stretching ranging from 0 to 4 psi, or 1 to 3 psi. In some embodiments, a 20 mil cast sheet of the polyethylene may exhibit a stress at yield in the transverse direction during biaxial stretching ranging from −1 to 3 psi, or 0 to 2 psi. In some embodiments, a 20 mil cast sheet of the polyethylene may exhibit a biaxially effective stress at yield during biaxial stretching ranging from 0 to 4 psi, or 1 to 3 psi.

In some embodiments, a 12 mil cast sheet of the polyethylene may exhibit an ultimate stress in the machine direction during biaxial stretching ranging from 0 to 10 psi, 2 to 8 psi, or 4 to 6 psi. In some embodiments, a 12 mil cast sheet of the polyethylene may exhibit an ultimate stress in the transverse direction during biaxial stretching ranging from −2 to 12, 0 to 10 psi, 2 to 8 psi, or 4 to 6 psi. In some embodiments, a 12 mil cast sheet of the polyethylene may exhibit a biaxially effective ultimate stress during biaxial stretching ranging from 0 to 10 psi, 2 to 8 psi, or 4 to 6 psi.

In some embodiments, a 16 mil cast sheet of the polyethylene may exhibit an ultimate stress in the machine direction during biaxial stretching ranging from 0 to 10 psi, 2 to 8 psi, or 4 to 6 psi. In some embodiments, a 16 mil cast sheet of the polyethylene may exhibit an ultimate stress in the transverse direction during biaxial stretching ranging from 0 to 10 psi, 2 to 8 psi, or 4 to 6 psi. In some embodiments, a 16 mil cast sheet of the polyethylene may exhibit an effective ultimate stress during biaxial stretching ranging from 0 to 10 psi, 2 to 8 psi, or 4 to 6 psi.

In some embodiments, a 20 mil cast sheet of the polyethylene may exhibit an ultimate stress in the machine direction during biaxial stretching ranging from 0 to 10 psi, 2 to 8 psi, or 4 to 6 psi. In some embodiments, a 20 mil cast sheet of the polyethylene may exhibit an ultimate stress in the transverse direction during biaxial stretching ranging from 0 to 12, 2 to 10 psi, or 4 to 8 psi. In some embodiments, a 20 mil cast sheet of the polyethylene may exhibit an effective ultimate stress during biaxial stretching ranging from 0 to 12 psi, 2 to 10 psi, or 4 to 8 psi.

In some embodiments, a 12 mil cast sheet of the polyethylene may exhibit a yield peak strain in the machine direction during biaxial stretching ranging from 0 to 20%, 2 to 18%, 4 to 16%, 6 to 14%, or 8 to 12%. In some embodiments, a 12 mil cast sheet of the polyethylene may exhibit a yield peak strain in the transverse direction during biaxial stretching ranging from 0 to 20%, 2 to 18%, 4 to 16%, 6 to 14%, or 8 to 12%. In some embodiments, a 12 mil cast sheet of the polyethylene may exhibit a biaxially effective yield peak strain during biaxial stretching ranging from 0 to 40%, 5 to 35%, 10 to 30%, or 15 to 25%.

In some embodiments, a 16 mil cast sheet of the polyethylene may exhibit a yield peak strain in the machine direction during biaxial stretching ranging from 1 to 30%, 5 to 20%, or 10 to 15%. In some embodiments, a 16 mil cast sheet of the polyethylene may exhibit a yield peak strain in the transverse direction during biaxial stretching ranging from 1 to 20%, 5 to 15%, or 10 to 12%. In some embodiments, a 16 mil cast sheet of the polyethylene may exhibit an effective yield peak strain during biaxial stretching ranging from 2 to 40%, 5 to 35%, 10 to 30%, or 15 to 25%.

In some embodiments, a 20 mil cast sheet of the polyethylene may exhibit a yield peak strain in the machine direction during biaxial stretching ranging from 5 to 25%, 10 to 20%, or 12 to 18%. In some embodiments, a 20 mil cast sheet of the polyethylene may exhibit a yield peak strain in the transverse direction during biaxial stretching ranging from 5 to 25%, 10 to 20%, or 12 to 18%. In some embodiments, a 20 mil cast sheet of the polyethylene may exhibit an effective yield peak strain during biaxial stretching ranging from 10 to 50%, 15 to 45%, 20 to 40%, or 25 to 35%.

The shape of the resultant thermoformed article may be determined by the shape of the mold. As would be understood by one skilled in the art with the aid of the present disclosure, the resultant thermoformed article may be formed to any desired shape and size. In certain embodiments, the thermoformed article is a food container or packaging, houseware article, cooking utensil, plate, cup, measuring cup, strainer, turkey baster, non-food storage container, filing cabinet, cabinet drawer, general storage device, organizer, tote, sweater box, rigid packaging, personal care product, bottle, jar, furniture, furniture component, building material, or building container component. For example and without limitation, the thermoformed article may be a yogurt container, cottage cheese container, butter container, dip container, spread container, or pasta salad container.

Certain embodiments of this disclosure relate to a thermoformed article, including sheet extruded thermoformed articles formed by the method disclosed herein, and thermoformed articles formed of the polyethylene disclosed herein. In some embodiments, the thermoformed article is a monolayer article. In other embodiments, the thermoformed article is a multilayer article having at least two layers. For example and without limitation, the thermoformed article may be formed by thermoforming a monolayer extruded sheet or a multilayer extruded sheet.

EXAMPLES

The disclosure having been generally described, the following examples show particular embodiments of the disclosure. It is understood that the example is given by way of illustration and is not intended to limit the specification or the claims. All compositions percentages given in the examples are by weight.

Example 1

Multi-Pass Extrusion

Multi-pass extrusion was performed on two different high density polyethylene resins, HDPE 9260 (Sample A, SA) and HDPE 6420 (Sample B, SB) as a comparative sample. HDPE 9260 and HDPE 6420 are made by Total Petrochemicals and Refining USA, Inc. Table 1 lists properties for both Sample A and Sample B.

TABLE 1

| Resin Properties | | |
|---|---|---|
| Resin | Sample B | Sample A |
| Density (g/cc) | 0.960 | 0.959 |
| $MI_2$ (dg/min) | 1.93 | 2.31 |
| HLMI (dg/min) | 55.3 | 126.8 |
| Shear Response | 29 | 55 |
| Yellowness Index (YI) | −3.2 | −1.8 |

In Table 1, density is measured in accordance with ASTM D792; $MI_2$ is measured in accordance with ASTM D-1238, at 190° C. and a load of 2.16 kg; HLMI is measured in accordance with ASTM-D-1238, at 190° C. and a load of 21.6 kg; shear response is measured in accordance with ASTM D-3518; and yellowness index is measured in accordance with ASTM D-6290.

Samples A and B, containing the additives indicated with an 'X' in Table 1A, were subjected to multi-pass extrusion.

TABLE 1A

| Additives | | |
|---|---|---|
| Additive | HDPE 9260 | HDPE 6420 |
| IRGANOX ® B-215 | X | |
| Calcium Stearate | X | |
| IRGANOX ® 1010 | | X |
| ULTRANOX ® 627AV | | X |
| VITON ® Free Flow SAR-7468 or VITON ®Z110 | | X |

In the multi-pass extrusions, each resin was subjected to five sequential passes through an extruder. During the multi-pass extrusions, the extruder was operated at about 250° C. (about 480° F.). Specimens of each of Samples A and B were taken for testing prior to the first pass through the extruder (Pass 0). Subsequent to the first pass through the extruder and prior to the second pass through the extruder, specimens of each of Samples A and B were taken for testing (Pass 1). Subsequent to the second pass through the extruder and prior to the third pass through the extruder, specimens of each of Samples A and B were taken for testing (Pass 2). Subsequent to the third pass through the extruder and prior to the fourth pass through the extruder, specimens of each of Samples A and B were taken for testing (Pass 3). Subsequent to the fourth pass through the extruder and prior to the fifth pass through the extruder, specimens of each of Samples A and B were taken for testing (Pass 4). Subsequent to the fifth pass through the extruder, specimens of each of Samples A and B were taken for testing (Pass 5). Each specimen was tested for color, $MI_2$, rheology, and gel permeation chromatography (GPC). An ESCR test was performed on Pass 0, Pass 3 and Pass 5 of each of Samples A and B, in accordance with ASTM D-1693, Condition B.

Table 2 shows the operational torque and pressure of the extruder used for each pass of each of Samples A and B, as well as the melt temperature of each of Samples A and B for each pass.

TABLE 2

| Extrusion Conditions | | |
|---|---|---|
| Resin | Sample A | Sample B |
| Melt Temperature @ Pass 1 | 257° C. | 254° C. |
| Melt Temperature @ Pass 2 | 257° C. | 255° C. |
| Melt Temperature @ Pass 3 | 257° C. | 251° C. |
| Melt Temperature @ Pass 4 | 255° C. | 256° C. |
| Melt Temperature @ Pass 5 | 255° C. | 254° C. |
| Torque @ Pass 1 | 15.7 N·M | 22.8 N·M |
| Torque @ Pass 2 | 19.9 N·M | 28.4 N·M |
| Torque @ Pass 3 | 22.3 N·M | 27.9 N·M |
| Torque @ Pass 4 | 23.6 N·M | 29.4 N·M |
| Torque @ Pass 5 | 23.8 N·M | 27.2 N·M |
| Pressure @ Pass 1 | 670 psi | 950 psi |
| Pressure @ Pass 2 | 820 psi | 960 psi |
| Pressure @ Pass 3 | 790 psi | 990 psi |
| Pressure @ Pass 4 | 760 psi | 990 psi |
| Pressure @ Pass 5 | 760 psi | 980 psi |

Table 3A shows the $MI_2$, HLMI and shear response for specimens of Sample A at Passes 0, 1, 2, 3, 4 and 5. Table 3B shows the $MI_2$, HLMI and shear response for specimens of Sample B at Passes 0, 1, 2, 3, 4 and 5.

TABLE 3A

| Sample A - Flow | | | |
|---|---|---|---|
| Pass | $MI_2$ (dg/min) | HLMI (dg/min) | Shear Response |
| 0 | 2.36 | 126.2 | 53.6 |
| 1 | 2.37 | 128.2 | 54.1 |
| 2 | 2.42 | 131.0 | 54.1 |
| 3 | 2.38 | 132.4 | 55.6 |
| 4 | 2.41 | 127.2 | 52.8 |
| 5 | 2.42 | 133.4 | 55.1 |

TABLE 3B

| Sample B - Flow | | | |
|---|---|---|---|
| Pass | $MI_2$ (dg/min) | HLMI (dg/min) | Shear Response |
| 0 | 1.93 | 54 | 28.0 |
| 1 | 1.97 | 54.3 | 27.6 |
| 2 | 1.95 | 54 | 27.7 |
| 3 | 1.93 | 54 | 28.0 |
| 4 | 1.93 | 53.6 | 27.8 |
| 5 | 1.89 | 53.5 | 28.3 |

In Tables 3A and 3B, the $MI_2$ is measured in accordance with ASTM D-1238, at 190° C. and a load of 2.16 kg; the HLMI is measured in accordance with ASTM-D-1238, at 190° C. and a load of 21.6 kg; and the shear response is measured in accordance with ASTM D-3518.

Table 4A shows the results of color determination tests performed on specimens of Sample A at Passes 0, 1, 2, 3, 4 and 5 in accordance with ASTM D-6290. Table 4B shows the results of color determination tests performed on specimens of Sample B at Passes 0, 1, 2, 3, 4 and 5 in accordance with ASTM D-6290.

TABLE 4A

| Sample A - Color | | | | |
|---|---|---|---|---|
| Pass | Color L | Color a | Color b | YI |
| 0 | 80.5 | −1.04 | −0.29 | −1.56 |
| 1 | 78.8 | −1.18 | −0.11 | −1.33 |
| 2 | 78.1 | −1.26 | 0.34 | −0.37 |
| 3 | 77.7 | −1.04 | 0.64 | 0.51 |
| 4 | 77.2 | −1.29 | 1.15 | 1.47 |
| 5 | 76.9 | −1.09 | 1.47 | 2.39 |

TABLE 4B

| Sample B - Color | | | | |
|---|---|---|---|---|
| Pass | Color L | Color a | Color b | YI |
| 0 | 79.6 | −1.47 | 1.15 | 1.25 |
| 1 | 78.7 | −2.25 | 2.70 | 4.10 |
| 2 | 78.0 | −2.75 | 3.73 | 6.04 |
| 3 | 77.7 | −2.91 | 4.59 | 7.88 |
| 4 | 77.9 | −2.93 | 5.10 | 9.00 |
| 5 | 77.4 | −3.18 | 5.86 | 10.56 |

Table 5 shows the results of GPC testing performed on specimens of each of Samples A and B at Passes 0, 3 and 5.

TABLE 5

| | GPC | | | | | |
|---|---|---|---|---|---|---|
| | Sample A | | | Sample B | | |
| | Pass 0 | Pass 3 | Pass 5 | Pass 0 | Pass 3 | Pass 5 |
| Mn | 10,864 | 10,959 | 11,016 | 19,704 | 19,922 | 19,931 |
| Mw | 107,295 | 107,706 | 109,408 | 104,082 | 105,220 | 103,957 |
| Mz | 748,375 | 732,048 | 745,792 | 532,679 | 521,461 | 497,829 |
| Mp | 33,710 | 34,700 | 34,700 | 56,185 | 58,726 | 57,866 |
| D | 9.88 | 9.83 | 9.93 | 5.28 | 5.28 | 5.22 |
| D' | 6.97 | 6.80 | 6.81 | 5.12 | 4.96 | 4.79 |

Figure 2:
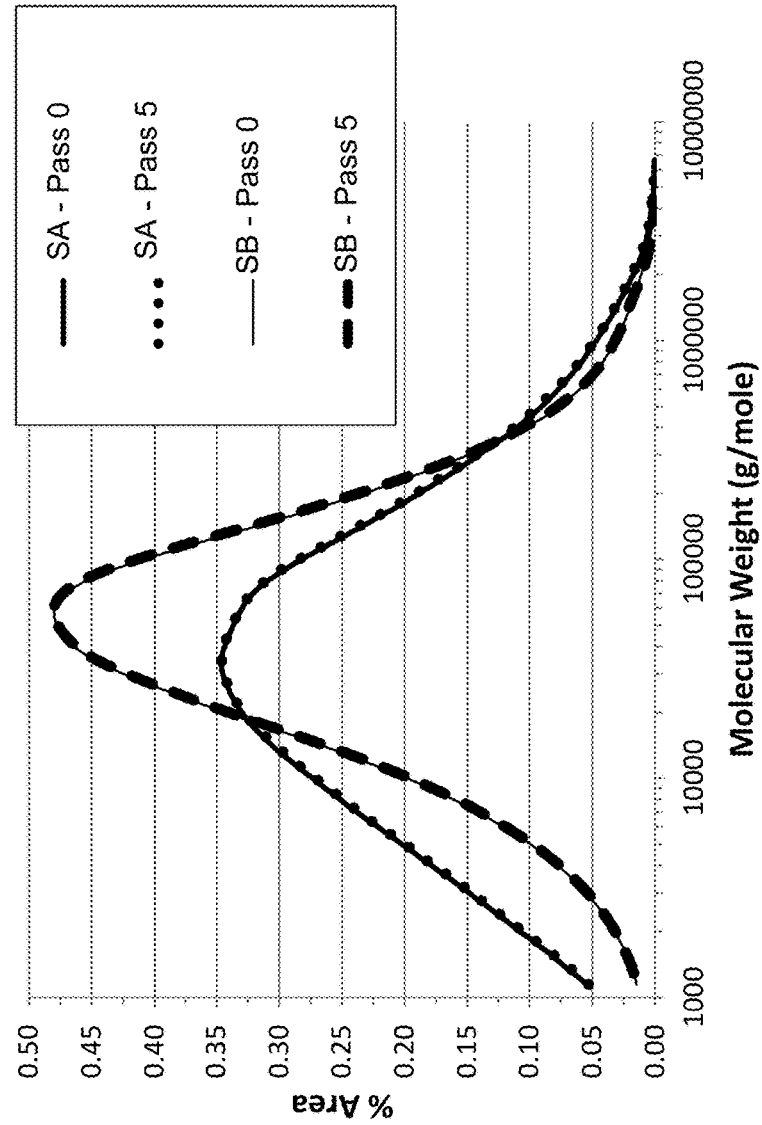
FIG. 2 is a graphical depiction of molecular weight versus percent area for resins in accordance with Example 1.

In Table 5, D is the polydispersity (Mw/Mn) and D' is Mz/Mw. FIG. 1 is a graphical depiction of molecular weight (g/mole) versus percent area for Sample A at Passes 0 and 5. The curves for Passes 0 and 5 are nearly identical, as is evident from the overlap of the curves in FIG. 1. Thus, after 5 passes through the extruder, Sample A exhibited a molecular weight (g/mole) versus percent area substantially similar to that of Sample A prior to any passes through the extruder, thus demonstrating the thermal stability of Sample A. FIG. 2 is a graphical depiction of molecular weight (g/mole) versus percent area for Sample A at Passes 0 and 5 and for Sample B at Passes 0 and 5. With reference to FIG. 2, the molecular weight distributions of Sample A at Pass 0 and at Pass 5 substantially overlap. Also with reference to FIG. 2, the molecular weight distributions of Sample B at Pass 0 and at Pass 5 substantially overlap.

Table 6 shows the crystallization data for specimens of both Samples A and B at Passes 0, 3 and 5, including crystallization temperature and crystallization enthalpy, as determined by DSC in accordance with ASTM D-3418. After determination of the first crystallization temperature and crystallization enthalpy, each sample was again tested to determine a second melt temperature and melt enthalpy, as determined by DSC in accordance with ASTM D-3418.

TABLE 6

| | Crystallization | | | | | |
|---|---|---|---|---|---|---|
| | Sample A | | | Sample B | | |
| | Pass 0 | Pass 3 | Pass 0 | Pass 3 | Pass 0 | Pass 3 |
| Crystallization Temperature (° C.) | 117.8 | 117.0 | 117.6 | 119.4 | 119.2 | 119.4 |

TABLE 6-continued

| | Crystallization | | | | | |
|---|---|---|---|---|---|---|
| | Sample A | | | Sample B | | |
| | Pass 0 | Pass 3 | Pass 0 | Pass 3 | Pass 0 | Pass 3 |
| Crystallization Enthalpy (J/g) | 200.6 | 199.6 | 201.5 | 204.5 | 210.5 | 210.3 |
| $2^{nd}$ Melt Temperature (° C.) | 132.1 | 132.6 | 132.0 | 134.6 | 134.8 | 134.6 |
| $2^{nd}$ Melt Enthalpy (J/g) | 206.4 | 203.4 | 204.8 | 204.8 | 211.5 | 211.7 |

Rheology tests were performed on specimens of each of Samples A and B at Passes 0, 3 and 5. The rheological breadth parameter was experimentally determined assuming Cox-Merz rule by fitting flow curves generated using linear-viscoelastic dynamic oscillatory frequency sweep experiments with a modified Carreau-Yasuda (CY) model, $\sigma = \sigma_B [1+(\lambda\gamma)\alpha]^{(n-1/\alpha)}$, as described herein. To facilitate model fitting, the power law constant (n) was held to a constant value (n=0). Experiments were carried out using a parallel plate geometry and strains within the linear viscoelastic regime over a frequency range of 0.1 to 316.2 sec (−1). Frequency sweeps were performed at three temperatures (170° C., 200° C., and 230° C.) and the data was shifted to form a master curve at 190° C. using known time-temperature superposition methods.

Table 7 shows results of the rheology tests performed on specimens of each of Samples A and B at Passes 0, 3 and 5, listing the ZSV, relaxation time, rheological breadth parameter, n, and activation energy.

TABLE 7

| | Rheology | | | | | |
|---|---|---|---|---|---|---|
| | Sample A | | | Sample B | | |
| | Pass 0 | Pass 3 | Pass 0 | Pass 3 | Pass 0 | Pass 3 |
| ZSV (Pa · sec) | 7807 | 8258 | 7659 | 5979 | 5536 | 5815 |
| Relaxation Time (sec) | 0.0097 | 0.0093 | 0.0099 | 0.0045 | 0.0050 | 0.0047 |
| Rheological breadth parameter | 0.296 | 0.291 | 0.294 | 0.361 | 0.360 | 0.350 |
| n | 0 | 0 | 0 | 0 | 0 | 0 |
| Ea (kJ/mol) | 26.31 | 26.02 | 25.82 | 25.14 | 24.61 | 24.60 |

Table 8 shows the results of the ESCR tests performed on Passes 0, 3 and 5 of each of Samples A and B, in accordance with ASTM D-1693, Condition B.

TABLE 8

| | ESCR | | | |
|---|---|---|---|---|
| Sample ID | Test Condition | Igepal % | Bath Temperature (° C.) | F50 |
| Sample B, Pass 5 | B | 10 | 50 | 18 |
| Sample B, Pass 3 | B | 10 | 50 | 18 |
| Sample B, Pass 0 | B | 10 | 50 | 18 |
| Sample A, Pass 5 | B | 10 | 50 | 77 |
| Sample A, Pass 3 | B | 10 | 50 | 47 |
| Sample A, Pass 0 | B | 10 | 50 | 64 |

Example 2

Resins

Material Selection—Three HDPE resins were selected for testing and comparison. The three HDPE resins were HDPE 5502 (Sample 3, S3), HDPE 6420 (Sample 2, S2), and HDPE 9260 (Sample 1, 51), each made by Total Petrochemicals and Refining USA, Inc. Table 9 presents an overview of properties of Samples 1-3 used in Example 2. The additives present in Samples 1-3 are indicated with an 'X'.

TABLE 9

| | Resins & Additives | | |
|---|---|---|---|
| Name | Sample 3 | Sample 2 | Sample 1 |
| | Product Specifications | | |
| Material type | HDPE | HDPE | HDPE (bimodal) |
| Melt flow (g/10 min) | 0.35 | 2 | 2 |
| Density (g/cc) | 0.955 | 0.962 | 0.958 |
| | Additives | | |
| Irganox 1010 | | X | X |
| Irganox 1076 | X | | |
| Irgafos 168 | | | X |
| Carbowax PEG 300 | X | | |
| Ultranox 627AV | | X | |
| Viton SAR-7468 | | X | |
| Calcium Stearate | | | X |

The HDPE melt flows reported in Table 9 are $MI_2$ method. Melt flows for the HDPE resins were determined at a temperature of 230° C.

Previously available measurements of the polymer resins used as Samples 1-3 are presented in Table 10. It should be noted that the results presented in Table 10 were obtained at different times prior to the current experiments of Example 2, but are believed to be representative of the polymer resins used to produce the cast sheets in the Example 3 (i.e., the polymer resins associated with Table 10 were not from the same production runs as the polymer resins used to form the cast sheets of Example 3 but fell within normal expected production and testing variation for such materials). The results in Table 10 include: GPC data, rheological data, and tensile data.

TABLE 10

| | Resin Properties | | |
|---|---|---|---|
| Polymer Resin | Sample 3 | Sample 2 | Sample 1 |
| | GPC | | |
| Mn (Daltons) | 17994 | 20049 | 11571 |
| Mw (Daltons) | 134431 | 98499 | 116872 |
| Mz (Daltons) | 1091893 | 446939 | 774628 |
| Peak MW | 40455 | 54760 | 31464 |
| Polydispersity (Mw/Mn) (—/—) | 7.5 | 4.9 | 10.1 |
| | Rheology | | |
| Activation Energy (kJ/mol) | 30.62 | 25.85 | 24.64 |
| Zero Shear Viscosity (Pa-s) | 4.82E+06 | 7.18E+03 | 1.16E+04 |
| Relaxation time (s) | 0.1562 | 0.0055 | 0.0142 |
| Rheological Breadth Parameter (—/—) | 0.1063 | 0.3363 | 0.2837 |
| Exponent (—/—) | 0 | 0 | 0 |
| Temperature (° C.) | 190 | 190 | 190 |
| | Tensile | | |
| Specimen Molding type | Compression Molding | Compression Molding | Compression Molding |
| Tensile Modulus (ksi) | 179 | 197 | 194 |
| Tensile Strength at Yield (psi) | 4016 | 4749 | 4290 |
| Elongation at Yield (%) | 6.9 | 5 | 6.4 |
| Tensile Strength at Break (psi) | 2474 | 3053 | 4313 |
| Elongation at Break (%) | 444 | 766 | 680 |

With regards to the tensile data in Table 10, the three HDPE resin specimens were molded by compression molding. Without being bound by theory, the elongation properties of the three HDPE resins is believed to be indicative of the ability to stretch the HDPE resins at low strain rates at room temperature. Unlike Samples 2 and 3, Sample 1 exhibited an increased strength at break compared to strength at yield. Without being bound by theory, it is believed that the increased strength at break in comparison to strength at yield of Sample 1 is indicative of the ability to strain-harden Sample 1.

Example 3

Cast Sheets

Cast Sheet Production—Monolayer cast sheets of Samples 1-3, as set forth in Table 9, were produced using a Mini-Sheet line (i.e., a KN150 extruder). The temperatures used during production of the cast sheets were held substantially constant, while the drive speed was altered to make adjustments in desired sheet thickness. Barrel pressure varied depending on the polymer resin tested. The cast sheet samples produced had thicknesses of 12 mil, 16 mil, and 20 mil.

Cast Sheet Analytical Results—Analytical testing was completed on samples of the cast sheets. The results are summarized in Tables 11A, 11B and 11C for the three HDPE resins. DSC was conducted on the as-cast sheets using the standard heating rate (10° C./min), at two cooling rates, 10° C./min and 20° C./min. Tensile tests were conducted on stamped type IV bars of the cast sheets oriented in the machine and transverse directions. The as-cast sheets were pulled to failure or to a max of 760% strain. Shrinkage tests were conducted on stamped square specimens of the as-cast sheets that were placed in an oven set at 195° C. for 3 minutes. Instrumented impact tests were only conducted on the thickest as-cast sheets (20 mil), and were performed at room temperature (23° C.) and at −30° C. Rectangular torsion testing was performed to measure storage and loss modulus on the thickest sheets (20 mil) while heating at 5° C./min.

TABLE 11A

Sample 3 Cast Sheet Properties

| Material | Sample 3 | | | | | |
|---|---|---|---|---|---|---|
| Sheet Thickness (in) | 0.0125 | | 0.0162 | | 0.0212 | |
| Density by Displacement | | | | | | |
| As-Cast Sheet (g/cc) | 0.9526 | | 0.9464 | | 0.9506 | |
| Cast Sheet After Remolding (g/cc) | | | 0.9517 | | | |
| DSC | | | | | | |
| Cooling Rate (° C./min) | 10 | 20 | 10 | 20 | 10 | 20 |
| 1$^{st}$ Melt ΔH (J/g) | 191.2 | 190.3 | 188.2 | 188.1 | 189.0 | 188.6 |
| 1$^{st}$ Melt Peak (° C.) | 130.5 | 130.2 | 131.1 | 131.2 | 131.4 | 131.5 |
| Density 1$^{st}$ Melt (g/cc) | 0.952 | 0.951 | 0.951 | 0.951 | 0.951 | 0.951 |
| Recrystallization ΔH (J/g) | 202.3 | 197.2 | 200.0 | 194.2 | 199.9 | 195.4 |
| Recrystallization Peak (° C.) | 118.8 | 116.8 | 118.5 | 115.5 | 118.2 | 115.3 |
| 2$^{nd}$ Melt ΔH (J/g) | 205.1 | 198.9 | 202.2 | 194.8 | 201.1 | 196.0 |
| 2$^{nd}$ Melt Peak (° C.) | 132.5 | 131.8 | 132.8 | 132.6 | 132.9 | 132.6 |
| Density 2$^{nd}$ Melt (g/cc) | 0.957 | 0.954 | 0.956 | 0.953 | 0.955 | 0.953 |
| Tensile | | | | | | |
| Orientation | MD | TD | MD | TD | MD | TD |
| Modulus (psi) | 144892 | 171760 | 165566 | 195387 | 175164 | 198467 |
| Stress at Yield (psi) | 3376 | 3651 | 3640 | 3695 | 3603 | 3761 |
| Elongation at Yield (%) | 5.7 | 4.6 | 5.8 | 4.7 | 5.8 | 4.8 |
| Maximum Stress (psi) | 3941 | 4265 | 4556 | 3926 | 4607 | 4156 |
| Stress at Break (psi) | 3336 | 3387 | 4075 | 2828 | 4309 | 2993 |
| Elongation at Break (%) | 515.1 | 587 | 579.3 | 461.6 | 643.3 | 554.8 |
| Shrinkage | | | | | | |
| Orientation | MD | TD | MD | TD | MD | TD |
| Shrinkage (%) | 75.29 | −22.65 | 68.82 | −23.53 | 63.53 | −20 |
| Initial Size (in) | 8.5 | 8.5 | 8.5 | 8.5 | 8.5 | 8.5 |
| Final Size (in) | 2.1 | 10.425 | 2.65 | 10.5 | 3.1 | 10.2 |
| Instrument Impact | | | | | | |
| Temperature (° C.) | | | | | 23 | −30 |
| Maximum Load (lbf) | | | | | 87.6 | 130.5 |
| Energy to Maximum Load (ft-lb) | | | | | 1.45 | 2.39 |
| Energy After Maximum Load (ft-lb) | | | | | 0.47 | 0.60 |
| Total Energy (ft-lb) | | | | | 1.92 | 3.00 |

TABLE 11B

Sample 2 Cast Sheet Properties

| Material | Sample 2 | | | | | |
|---|---|---|---|---|---|---|
| Sheet Thickness (in) | 0.0125 | | 0.0162 | | 0.0212 | |
| Density by Displacement | | | | | | |
| As-Cast Sheet (g/cc) | 0.9567 | | 0.9541 | | 0.9535 | |
| Cast Sheet After Remolding (g/cc) | | | 0.9581 | | | |
| DSC | | | | | | |
| Cooling Rate (° C./min) | 10 | 20 | 10 | 20 | 10 | 20 |
| 1$^{st}$ Melt ΔH (J/g) | 201.1 | 198.7 | 203.1 | 198.2 | 203.3 | 199.6 |
| 1$^{st}$ Melt Peak (° C.) | 132.4 | 132.6 | 133.0 | 133.2 | 134.1 | 133.6 |
| Density 1$^{st}$ Melt (g/cc) | 0.955 | 0.954 | 0.956 | 0.954 | 0.956 | 0.955 |
| Recrystallization ΔH (J/g) | 223.6 | 216.6 | 224.0 | 214.7 | 218.5 | 211.0 |
| Recrystallization Peak (° C.) | 119.9 | 117.7 | 119.5 | 116.7 | 118.9 | 116.4 |
| 2$^{nd}$ Melt ΔH (J/g) | 224.5 | 215.9 | 225.5 | 214.9 | 217.3 | 210.3 |
| 2$^{nd}$ Melt Peak (° C.) | 134.4 | 134.2 | 134.9 | 135.0 | 135.5 | 135.3 |
| Density 2$^{nd}$ Melt (g/cc) | 0.963 | 0.960 | 0.964 | 0.960 | 0.961 | 0.958 |

TABLE 11B-continued

| Sample 2 Cast Sheet Properties | | | | | | |
|---|---|---|---|---|---|---|
| Tensile | | | | | | |
| Orientation | MD | TD | MD | TD | MD | TD |
| Modulus (psi) | 195966 | 175325 | 205842 | 185706 | 213828 | 200251 |
| Stress at Yield (psi) | 4076 | 3637 | 4070 | 3735 | 4171 | 3878 |
| Elongation at Yield (%) | 5.4 | 5.7 | 5.1 | 5.3 | 5.3 | 5.7 |
| Maximum Stress (psi) | 5124 | 4467 | 4878 | 4342 | 4751 | 4444 |
| Stress at Break (psi) | 5124 | 4466 | 4878 | 4341 | 4751 | 4443 |
| Elongation at Break (%) | 762.7 | 760 | 760 | 760 | 760 | 760 |
| Shrinkage | | | | | | |
| Orientation | MD | TD | MD | TD | MD | TD |
| Shrinkage (%) | 30 | 5 | 19.71 | 6.47 | 13.82 | 4.41 |
| Initial Size (in) | 8.5 | 8.5 | 8.5 | 8.5 | 8.5 | 8.5 |
| Final Size (in) | 5.95 | 8.075 | 6.825 | 7.95 | 7.325 | 8.125 |
| Instrument Impact | | | | | | |
| Temperature (° C.) | | | | | 23 | −30 |
| Maximum Load (lbf) | | | | | 89.4 | 126.8 |
| Energy to Maximum Load (ft-lb) | | | | | 1.54 | 2.41 |
| Energy After Maximum Load (ft-lb) | | | | | 0.39 | 0.56 |
| Total Energy (ft-lb) | | | | | 1.93 | 2.97 |

TABLE 11C

| Sample 1 Cast Sheet Properties | | | | | | |
|---|---|---|---|---|---|---|
| Material | | Sample 1 | | | | |
| Sheet Thickness (in) | | 0.0125 | | 0.0162 | | 0.0212 |
| Density by Displacement | | | | | | |
| As-Cast Sheet (g/cc) | | 0.9526 | | 0.9538 | | 0.953 |
| Cast Sheet After Remolding (g/cc) | | | | 0.9555 | | |
| DSC | | | | | | |
| Cooling Rate (° C./min) | 10 | 20 | 10 | 20 | 10 | 20 |
| $1^{st}$ Melt ΔH (J/g) | 200.6 | 196.9 | 201.1 | 198.7 | 197.2 | 199.5 |
| $1^{st}$ Melt Peak (° C.) | 129.5 | 129.9 | 130.3 | 130.2 | 131.2 | 130.8 |
| Density $1^{st}$ Melt (g/cc) | 0.955 | 0.954 | 0.955 | 0.954 | 0.954 | 0.955 |
| Recrystallization ΔH (J/g) | 215.2 | 206.6 | 212.7 | 211.2 | 207.0 | 212.5 |
| Recrystallization Peak (° C.) | 118.2 | 116.3 | 117.8 | 116.0 | 117.1 | 116.0 |
| $2^{nd}$ Melt ΔH (J/g) | 217.4 | 208.8 | 216.0 | 213.6 | 209.4 | 211.2 |
| $2^{nd}$ Melt peak (° C.) | 131.6 | 131.2 | 132.1 | 131.4 | 132.7 | 131.6 |
| Density $2^{nd}$ Melt (g/cc) | 0.961 | 0.958 | 0.960 | 0.960 | 0.958 | 0.959 |
| Tensile | | | | | | |
| Orientation | MD | TD | MD | TD | MD | TD |
| Modulus (psi) | 186662 | 174952 | 205217 | 195058 | 215512 | 197201 |
| Stress at Yield (psi) | 3962 | 3738 | 4092 | 3860 | 4152 | 3967 |
| Elongation at Yield (%) | 4.8 | 5.2 | 5.1 | 5.6 | 5.2 | 6 |
| Maximum Stress (psi) | 5078 | 4383 | 5004 | 4377 | 4540 | 4266 |
| Stress at Break (psi) | 5077 | 4289 | 5004 | 4377 | 3649 | 4064 |
| Elongation at Break (%) | 760 | 754 | 760 | 760 | 682.6 | 730.9 |
| Shrinkage | | | | | | |
| Orientation | MD | TD | MD | TD | MD | TD |
| Shrinkage (%) | 46.18 | −1.47 | 38.82 | 0.88 | 27.94 | 1.18 |
| Initial Size (in) | 8.5 | 8.5 | 8.5 | 8.5 | 8.5 | 8.5 |
| Final Size (in) | 4.575 | 8.625 | 5.2 | 8.425 | 6.125 | 8.4 |
| Instrument Impact | | | | | | |
| Temperature (° C.) | | | | | 23 | −30 |
| Maximum Load (lbf) | | | | | 85.6 | 130.6 |
| Energy to Maximum Load (ft-lb) | | | | | 1.27 | 2.35 |
| Energy After Maximum Load (ft-lb) | | | | | 0.54 | 0.76 |
| Total Energy (ft-lb) | | | | | 1.81 | 3.11 |

Figure 3:
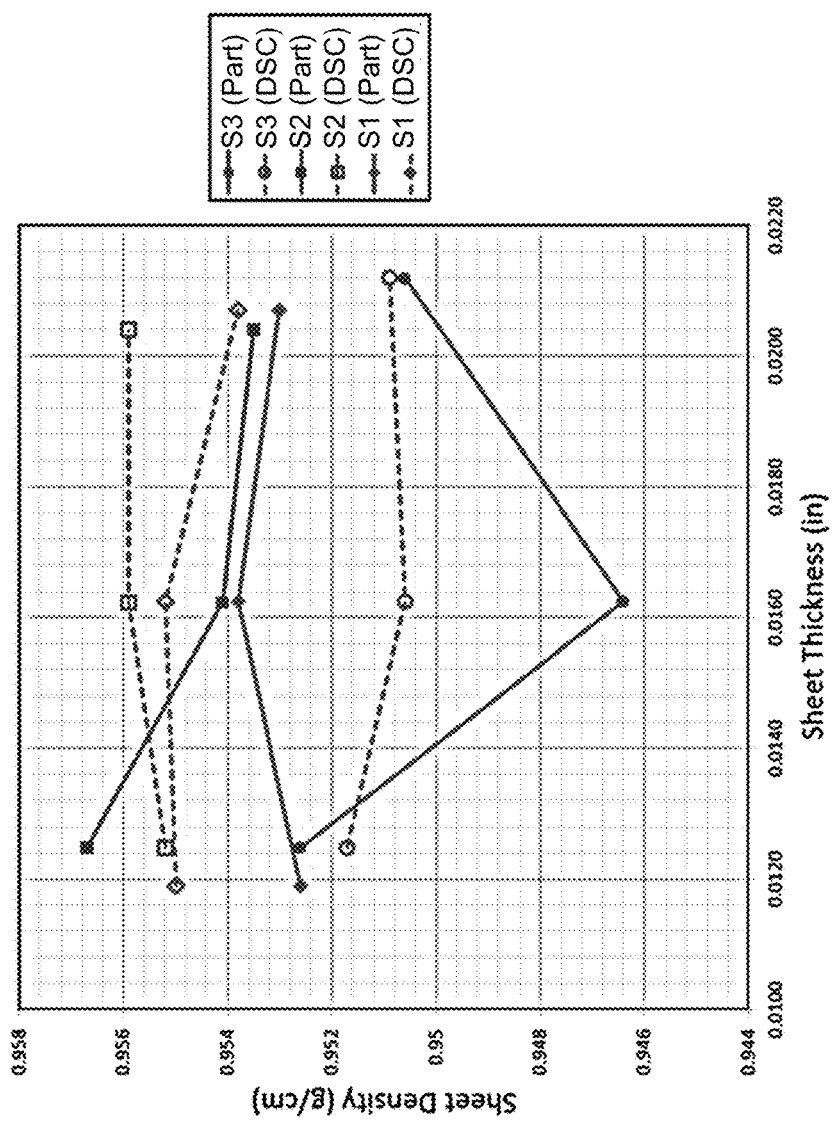
FIG. 3 is a graphical depiction of cast sheet density versus cast sheet thickness for cast sheets in accordance with Example 3.

FIG. 3 is a graphical depiction of cast sheet density versus cast sheet thickness, including both density as determined by displacement and density inferred from DSC testing, for the three HDPE resins.

Figure 4:
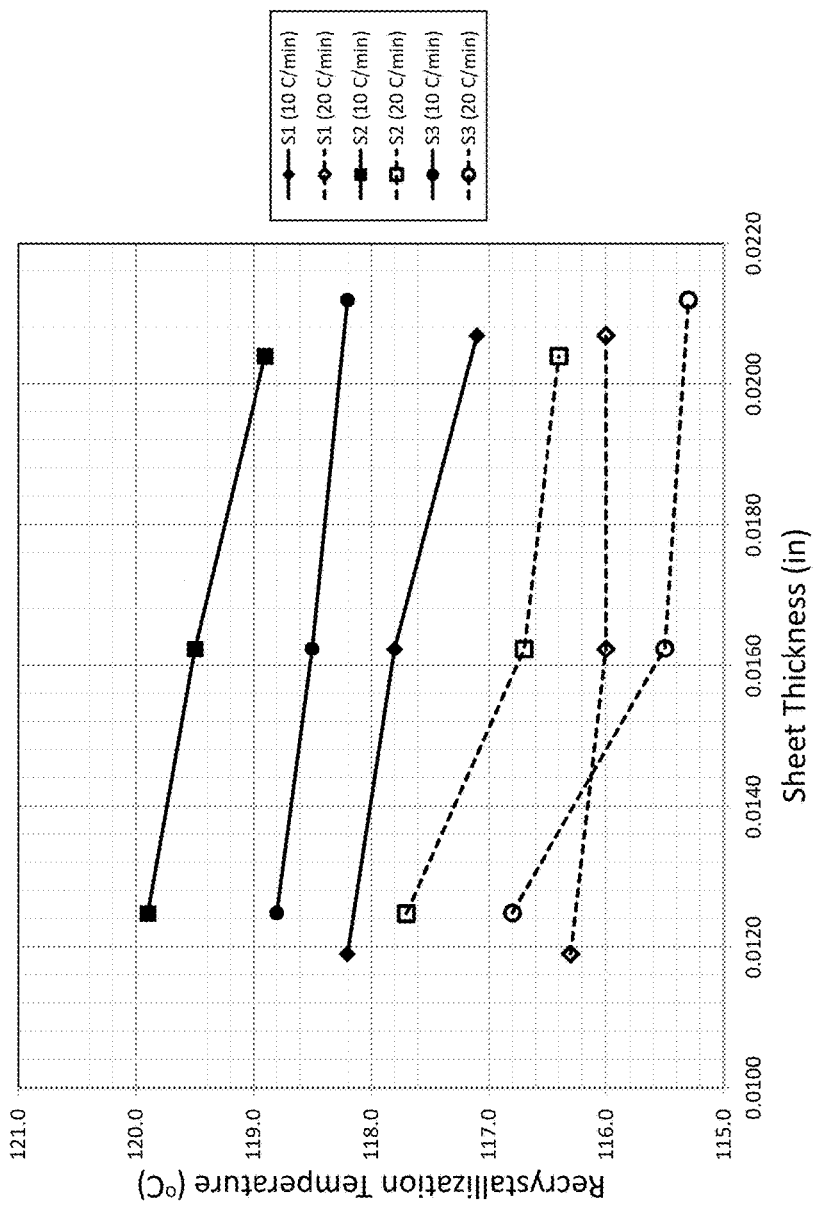
FIG. 4 is a graphical depiction of recrystallization temperature versus cast sheet thickness for cast sheets in accordance with Example 3.

FIG. 4 is a graphical depiction of recrystallization temperature, as determined using cooling rates of 10° C./min. and 20° C./min., versus cast sheet thickness.

Figure 5:
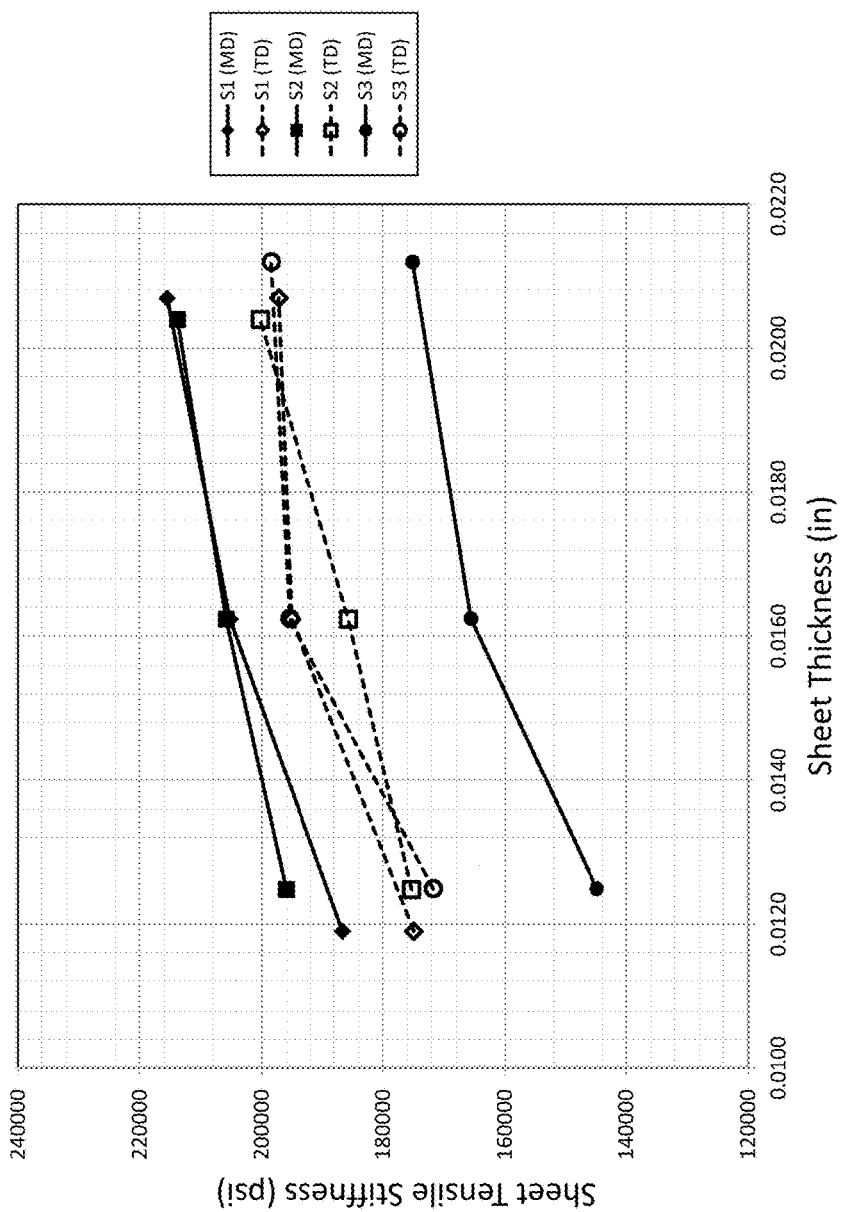
FIG. 5 is a graphical depiction of cast sheet tensile stiffness versus cast sheet thickness for cast sheets in accordance with Example 3.
Figure 6:
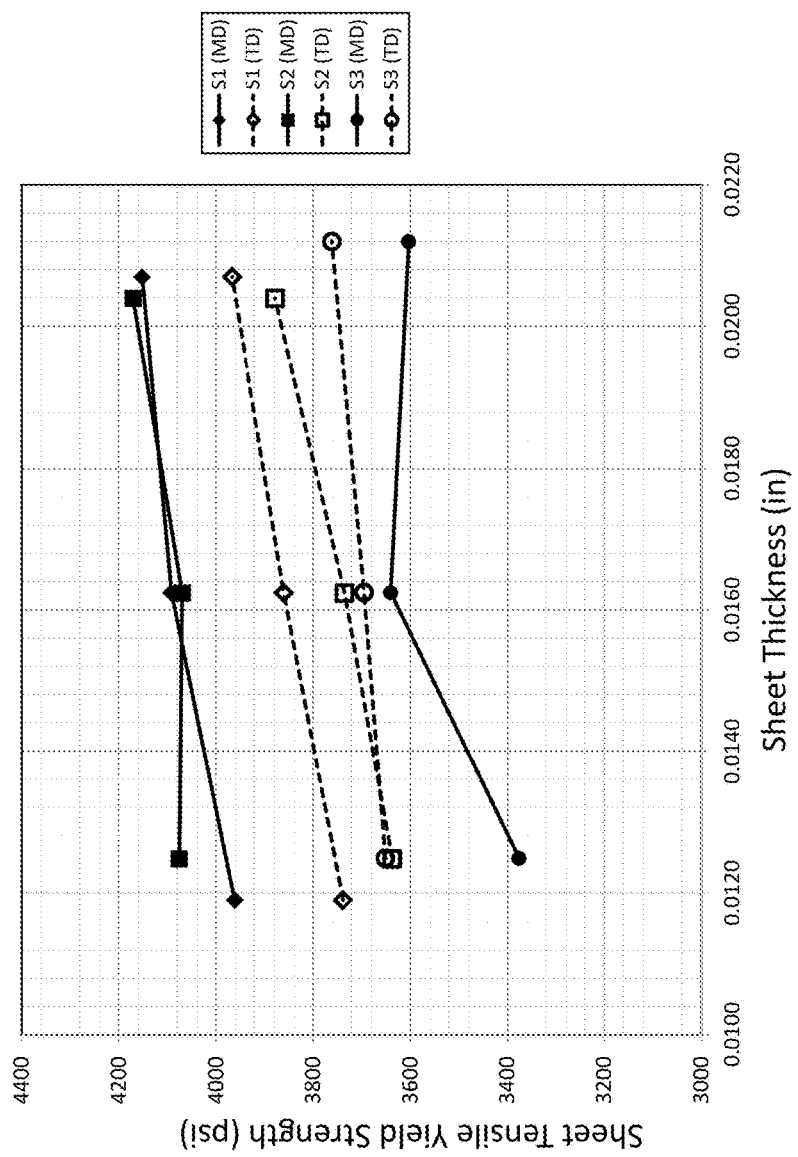
FIG. 6 is a graphical depiction of cast sheet tensile yield strength versus cast sheet thickness for cast sheets in accordance with Example 3.

FIGS. 5 and 6 are graphical depictions of tensile properties of the cast sheets. FIG. 5 is a graphical depiction of cast sheet tensile stiffness, oriented in the machine direction and transverse direction, versus cast sheet thickness. FIG. 6 is a graphical depiction of cast sheet tensile yield strength, oriented in the machine direction and transverse direction, versus cast sheet thickness.

Figure 7:
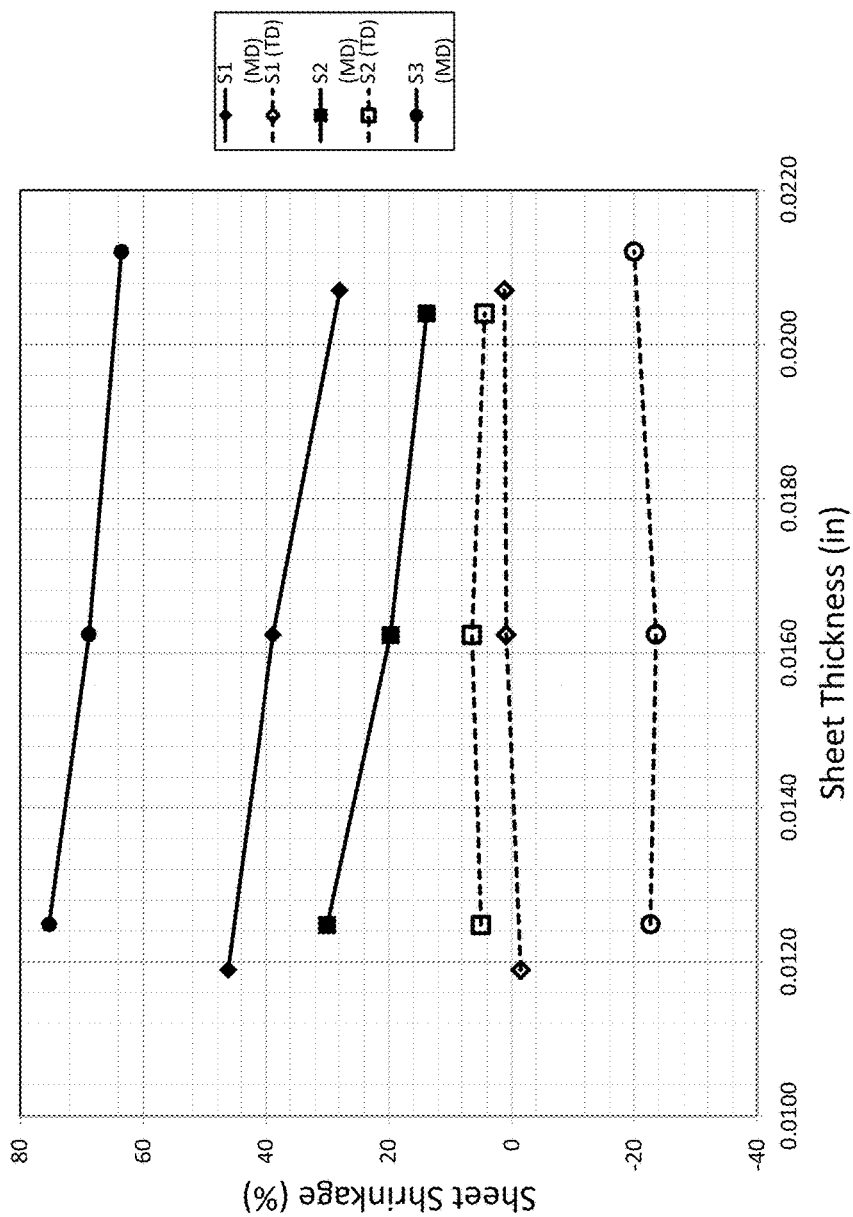
FIG. 7 is a graphical depiction of cast sheet shrinkage versus cast sheet thickness for cast sheets in accordance with Example 3.

FIG. 7 is a graphical depiction of cast sheet shrinkage % versus cast sheet thickness. MD shrinkage was observed to decrease with increasing sheet thickness. Thinner cast sheets were observed to reach a higher temperature during the testing.

The impact performance of the cast sheets was found to be similar at room temperate. All of the HDPE resins exhibited enhanced impact performance at −30° C. relative to room temperature.

Figure 8:
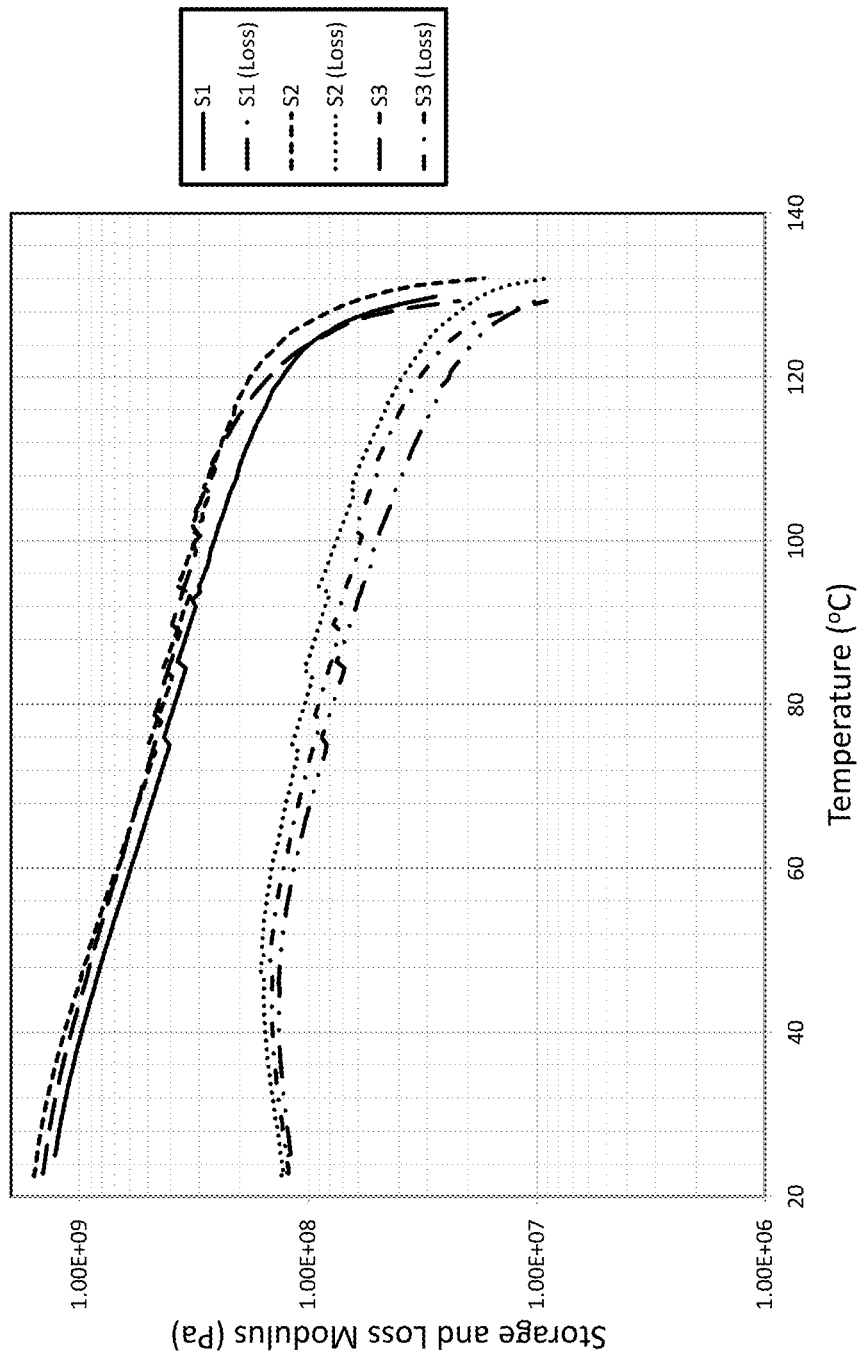
FIG. 8 is a graphical depiction of storage and loss modulus versus temperature for cast sheets in accordance with Example 3.
Figure 9:
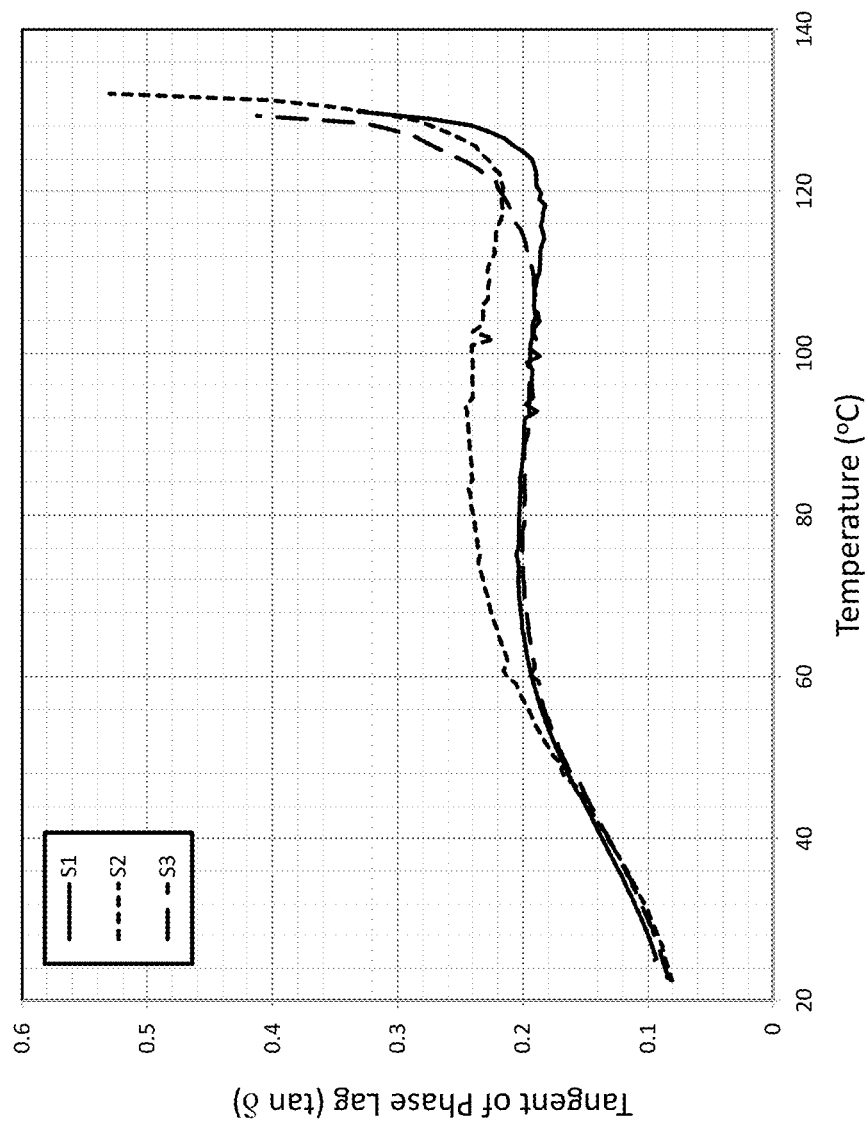
FIG. 9 is a graphical depiction of tangent of phase lag (tan δ) versus temperature (° C.) for cast sheets in accordance with Example 3.

Rectangular torsion results are presented in FIGS. 8 and 9. FIG. 8 is a graphical depiction of storage and loss modulus versus temperature and FIG. 9 is a graphical depiction of tangent of phase-lag versus temperature. Sample 1 exhibited the lowest phase lag up to 128° C.

Example 4

Biaxial Stretching—Specimen Preparation

Specimens of as-cast sheets of Samples 1-3 produced in accordance with Example 3 were prepared for bi-axial stretching using a Bruckner Biaxial Stretcher. The specimens for biaxial stretching were prepared by stamping an 8.5 cm×8.5 cm square from the as-cast sheets such that the machine and transverse directions were aligned with the edges of the square specimens. Before loading the specimens in an oven, the oven was equilibrated at the desired temperature and gripping clips were preheated in the oven. When loading the specimens, the machine direction was aligned with the primary stretching direction of the Bruckner Biaxial Stretcher. The specimens were inserted in the oven when the clip temperature was 100±3° C. The stretch ratios used were limited to proportional machine and transverse stretch ratios, i.e., 2×2, 3×3 and 4×4 ratios. During stretching, data was recorded by Bruckner software of the Bruckner Biaxial Stretcher for "successful" stretches. Stretches were considered "successful" when all of the clip's grips remained intact and the specimens were devoid of tears and holes. A minimum of three "successful" specimens were required to qualify a test as "Pass."

Example 5

Biaxial Stretching—Temperature and Preheat Time Variance

Cast sheet specimens of Samples 1-3 produced in accordance with Example 4 were subjected to biaxial stretching in a Bruckner Biaxial Stretcher. A stretch ratio of 2×2 and a strain rate of 50%/s were used during the biaxial stretching of Example 5. The temperature and preheat waiting time were varied during the biaxial stretching of Example 5. When determined pass-fail results at two different preheat waiting times were in agreement, the pass-fail results of intermediate preheat waiting times were assumed to be in agreement with the determined pass-fail results. For example, when a 30 second (s) preheat waiting time and a 60 s preheat waiting time both resulted in successful stretching, it was assumed that stretches with a 40 s preheat waiting time and a 50 s preheat waiting time would also result in successful stretching.

Without being bound by theory, heat transfer is expected to be impacted by cast sheet thickness; therefore, both 20 mil and 12 mil cast sheets were tested in Example 5. The Pass-Fail results obtained in Example 5 are summarized in Tables 12A, 12B, 12C, 12D, 12E and 12F.

TABLE 12A

Sample 3 (12 mil)
Material - Sample 3/Thickness - 12 mil

| | | Temperature (° C.) | | | | |
|---|---|---|---|---|---|---|
| | | 124 | 128 | 132 | 136 | 140 |
| Preheat (s) | 20 | <20% Pass | >80% Pass | >80% Pass | >80% Pass | >80% Pass |
| | 30 | <20% Pass | >80% Pass | >80% Pass | >80% Pass | >80% Pass |
| | 40 | <20% Pass | >80% Pass | >80% Pass | >80% Pass | >80% Pass |
| | 50 | <20% Pass | >80% Pass | >80% Pass | >80% Pass | >80% Pass |
| | 60 | <20% Pass | >80% Pass | 20-80% Pass | >80% Pass | >80% Pass |

TABLE 12B

Sample 3 (20 mil)
Material - Sample 3/Thickness - 20 mil

| | | Temperature (° C.) | | | | |
|---|---|---|---|---|---|---|
| | | 124 | 128 | 132 | 136 | 140 |
| Preheat (s) | 20 | <20% Pass | <20% Pass | <20% Pass | >80% Pass | >80% Pass |
| | 30 | <20% Pass | >80% Pass | >80% Pass | >80% Pass | >80% Pass |

TABLE 12B-continued

Sample 3 (20 mil)
Material - Sample 3/Thickness - 20 mil

| | | Temperature (° C.) | | | | |
|---|---|---|---|---|---|---|
| | | 124 | 128 | 132 | 136 | 140 |
| | 40 | <20% Pass | >80% Pass | >80% Pass | >80% Pass | >80% Pass |
| | 50 | <20% Pass | >80% Pass | >80% Pass | >80% Pass | >80% Pass |
| | 60 | <20% Pass | >80% Pass | >80% Pass | >80% Pass | >80% Pass |

TABLE 12C

Sample 2 (12 mil)
Material - Sample 2/Thickness - 12 mil

| | | Temperature (° C.) | | | | |
|---|---|---|---|---|---|---|
| | | 124 | 128 | 132 | 136 | 140 |
| Preheat (s) | 20 | <20% Pass | <20% Pass | <20% Pass | 20-80% Pass | <20% Pass |
| | 30 | <20% Pass | <20% Pass | <20% Pass | <20% Pass | <20% Pass |
| | 40 | <20% Pass | <20% Pass | <20% Pass | >80% Pass | <20% Pass |
| | 50 | <20% Pass | <20% Pass | <20% Pass | 20-80% Pass | <20% Pass |
| | 60 | <20% Pass | <20% Pass | <20% Pass | 20-80% Pass | <20% Pass |

TABLE 12D

Sample 2 (20 mil)
Material - Sample 2/Thickness - 20 mil

| | | Temperature (° C.) | | | | |
|---|---|---|---|---|---|---|
| | | 124 | 128 | 132 | 136 | 140 |
| Preheat (s) | 20 | <20% Pass | <20% Pass | <20% Pass | <20% Pass | <20% Pass |
| | 30 | <20% Pass | <20% Pass | <20% Pass | <20% Pass | <20% Pass |
| | 40 | <20% Pass | <20% Pass | <20% Pass | >80% Pass | <20% Pass |
| | 50 | <20% Pass | <20% Pass | <20% Pass | <20% Pass | <20% Pass |
| | 60 | <20% Pass | <20% Pass | <20% Pass | <20% Pass | <20% Pass |

TABLE 12E

Sample 1 (12 mil)
Material - Sample 1/Thickness - 12 mil

| | | Temperature (° C.) | | | | |
|---|---|---|---|---|---|---|
| | | 124 | 128 | 132 | 136 | 140 |
| Preheat (s) | 20 | <20% Pass | >80% Pass | >80% Pass | 20-80% Pass | >80% Pass |
| | 30 | <20% Pass | >80% Pass | >80% Pass | >80% Pass | <20% Pass |
| | 40 | <20% Pass | >80% Pass | >80% Pass | >80% Pass | <20% Pass |
| | 50 | <20% Pass | >80% Pass | >80% Pass | >80% Pass | <20% Pass |
| | 60 | <20% Pass | >80% Pass | >80% Pass | <20% Pass | <20% Pass |

TABLE 12F

Sample 1 (20 mil)
Material - Sample 1/Thickness - 20 mil

| | | Temperature (° C.) | | | | |
|---|---|---|---|---|---|---|
| | | 124 | 128 | 132 | 136 | 140 |
| Preheat (s) | 20 | <20% Pass | <20% Pass | <20% Pass | <20% Pass | <20% Pass |
| | 30 | <20% Pass | >80% Pass | >80% Pass | >80% Pass | >80% Pass |
| | 40 | <20% Pass | >80% Pass | >80% Pass | >80% Pass | >80% Pass |
| | 50 | <20% Pass | >80% Pass | >80% Pass | >80% Pass | >80% Pass |
| | 60 | <20% Pass | >80% Pass | >80% Pass | >80% Pass | 20-80% Pass |

The data recorded by the Bruckner software during Example 5 was analyzed and is compiled into Tables 13A, 13B, 13C and 13D for the 12 mil cast sheets, and Tables 14A, 14B, 14C, and 14D for the 20 mil cast sheets.

TABLE 13A

Stiffness (12 mil)

| Material | Control Temperature (° C.) | Preheat Time (s) | Sheet Temperature (° C.) | Stiffness (psi) M | T | Eff |
|---|---|---|---|---|---|---|
| Sample 3 | 128 | 60 | 128.3 | 60.35 | 81.13 | 45.06 |
| | 128 | 20 | 127.9 | 98.26 | 125.7 | 72.06 |
| | 132 | 20 | 131.9 | 124.7 | 157.7 | 71.09 |
| | 132 | 50 | 132.9 | 53.91 | -1.13 | 26.71 |
| | 136 | 20 | 136.1 | 9.79 | 105.8 | 44.82 |
| | 136 | 60 | 136.9 | 28.36 | -0.72 | 13.90 |
| | 140 | 20 | 139.7 | 6.15 | 171.3 | 79.86 |
| | 140 | 60 | 140.3 | 6.35 | -0.49 | 3.37 |
| Sample 2 | 136 | 20 | 136.5 | 88.49 | 73.41 | 46.69 |
| | 136 | 40 | 139.0 | 31.65 | 0.57 | 15.35 |
| | 136 | 60 | 135.9 | 25.65 | 0.02 | 12.25 |
| Sample 1 | 128 | 40 | 127.7 | 76.70 | 1.77 | 38.92 |
| | 128 | 60 | 128.1 | 100.7 | 141.0 | 61.65 |
| | 132 | 20 | 132.5 | 49.88 | 181.2 | 68.83 |
| | 132 | 60 | 135.3 | 20.48 | 140.5 | 63.86 |
| | 136 | 20 | 132.0 | 22.14 | 122.3 | 52.06 |
| | 136 | 30 | 136.5 | -1.16 | 42.02 | 20.98 |
| | 136 | 40 | 136.3 | 0.37 | -0.83 | 0.39 |
| | 136 | 50 | 137.2 | -1.50 | -0.31 | 1.68 |
| | 140 | 20 | 140.8 | 1.04 | 1.07 | 1.50 |

TABLE 13B

Stress at Yield (12 mil)

| Material | Control Temperature (° C.) | Preheat Time (s) | Sheet Temperature (° C.) | Stress at Yield (psi) M | T | Eff |
|---|---|---|---|---|---|---|
| Sample 3 | 128 | 60 | 128.3 | 1.89 | 2.70 | 2.78 |
| | 128 | 20 | 127.9 | 3.30 | 4.02 | 4.57 |
| | 132 | 20 | 131.9 | 4.43 | 7.05 | 6.19 |
| | 132 | 50 | 132.9 | 1.00 | 0.04 | 0.98 |
| | 136 | 20 | 136.1 | 0.53 | 2.20 | 2.09 |
| | 136 | 60 | 136.9 | 0.71 | -0.04 | 0.73 |
| | 140 | 20 | 139.7 | 0.81 | 4.56 | 4.22 |
| | 140 | 60 | 140.3 | 0.13 | 0.01 | 0.13 |
| Sample 2 | 136 | 20 | 136.5 | 2.24 | 1.48 | 2.29 |
| | 136 | 40 | 139.0 | 0.66 | -0.03 | 0.67 |
| | 136 | 60 | 135.9 | 0.66 | 0.01 | 0.65 |
| Sample 1 | 128 | 40 | 127.7 | 1.68 | 0.09 | 1.64 |
| | 128 | 60 | 128.1 | 4.51 | 6.06 | 5.45 |
| | 132 | 20 | 132.5 | 1.47 | 2.51 | 2.25 |
| | 132 | 60 | 135.3 | 0.29 | 1.44 | 1.33 |
| | 136 | 20 | 132.0 | 2.02 | 3.90 | 3.38 |
| | 136 | 30 | 136.5 | 0.20 | 1.62 | 1.53 |
| | 136 | 40 | 136.3 | 0.01 | -0.02 | 0.02 |
| | 136 | 50 | 137.2 | -0.01 | -0.01 | 0.01 |
| | 140 | 20 | 140.8 | 0.02 | 0.00 | 0.05 |

TABLE 13C

Ultimate Stress (12 mil)

| Material | Control Temperature (° C.) | Preheat Time (s) | Sheet Temperature (° C.) | Ultimate Stress (psi) M | T | Eff |
|---|---|---|---|---|---|---|
| Sample 3 | 128 | 60 | 128.3 | 4.33 | 8.55 | 7.42 |
| | 128 | 20 | 127.9 | 6.16 | 10.46 | 9.20 |
| | 132 | 20 | 131.9 | 6.67 | 11.24 | 9.80 |
| | 132 | 50 | 132.9 | 5.46 | 5.72 | 5.68 |
| | 136 | 20 | 136.1 | 3.05 | 6.94 | 6.06 |
| | 136 | 60 | 136.9 | 2.61 | 1.81 | 2.56 |
| | 140 | 20 | 139.7 | 2.47 | 10.32 | 9.35 |
| | 140 | 60 | 140.3 | -0.55 | 0.04 | 0.58 |
| Sample 2 | 136 | 20 | 136.5 | 4.81 | 4.05 | 5.82 |
| | 136 | 40 | 139.0 | 1.61 | 4.67 | 4.15 |
| | 136 | 60 | 135.9 | 1.94 | 3.66 | 3.28 |
| Sample 1 | 128 | 40 | 127.7 | 5.33 | 10.01 | 8.73 |
| | 128 | 60 | 128.1 | 6.65 | 8.79 | 7.95 |
| | 132 | 20 | 132.5 | 5.56 | 7.66 | 6.86 |
| | 132 | 60 | 135.3 | 3.96 | 4.32 | 4.17 |
| | 136 | 20 | 132.0 | 4.03 | 6.92 | 6.02 |
| | 136 | 30 | 136.5 | 0.33 | 3.18 | 3.03 |
| | 136 | 40 | 136.3 | 0.00 | -0.06 | 0.07 |
| | 136 | 50 | 137.2 | 0.01 | -0.02 | 0.06 |
| | 140 | 20 | 140.8 | -0.030 | 0.15 | 0.18 |

TABLE 13D

Yield Peak Strain (12 mil)

| Material | Control Temperature (° C.) | Preheat Time (s) | Sheet Temperature (° C.) | Yield Peak Strain (%) M | T | Eff |
|---|---|---|---|---|---|---|
| Sample 3 | 128 | 60 | 128.3 | 7.85 | 7.82 | 15.66 |
| | 128 | 20 | 127.9 | 16.90 | 16.70 | 33.60 |
| | 132 | 20 | 131.9 | 15.47 | 15.35 | 30.82 |
| | 132 | 50 | 132.9 | 3.16 | 3.09 | 6.25 |
| | 136 | 20 | 136.1 | 11.73 | 11.47 | 23.19 |

TABLE 13D-continued

Yield Peak Strain (12 mil)

| Material | Control Temperature (° C.) | Preheat Time (s) | Sheet Temperature (° C.) | Yield Peak Strain (%) M | T | Eff |
|---|---|---|---|---|---|---|
| | 136 | 60 | 136.9 | 3.93 | 3.84 | 7.78 |
| | 140 | 20 | 139.7 | 13.36 | 13.32 | 26.68 |
| | 140 | 60 | 140.3 | 1.57 | 1.36 | 2.93 |
| Sample 2 | 136 | 20 | 136.5 | 13.04 | 12.85 | 25.89 |
| | 136 | 40 | 139.0 | 4.29 | 4.13 | 8.42 |
| | 136 | 60 | 135.9 | 4.64 | 4.32 | 8.96 |
| Sample 1 | 128 | 40 | 127.7 | 9.82 | 9.59 | 19.40 |
| | 128 | 60 | 128.1 | 17.47 | 17.65 | 35.11 |
| | 132 | 20 | 132.5 | 13.39 | 13.29 | 26.68 |
| | 132 | 60 | 135.3 | 8.77 | 8.64 | 17.40 |
| | 136 | 20 | 132.0 | 15.06 | 14.94 | 29.99 |
| | 136 | 30 | 136.5 | 10.41 | 10.35 | 20.76 |
| | 136 | 40 | 136.3 | 0.09 | 0.12 | 0.21 |
| | 136 | 50 | 137.2 | 0.26 | 0.35 | 0.61 |
| | 140 | 20 | 140.8 | 0.50 | 0.55 | 1.05 |

TABLE 14A

Stiffness (20 mil)

| Material | Control Temperature (° C.) | Preheat Time (s) | Sheet Temperature (° C.) | Stiffness (psi) M | T | Eff |
|---|---|---|---|---|---|---|
| Sample 3 | 128 | 30 | 127.9 | 145.8 | 0.0 | 71.4 |
| | 128 | 30 | 127.8 | 68.9 | 151.9 | 54.7 |
| | 128 | 60 | 128.5 | 82.1 | −0.4 | 43.1 |
| | 132 | 30 | 133.8 | 87.2 | 48.7 | 53.5 |
| | 132 | 60 | 132.8 | 97.0 | 102.6 | 55.2 |
| | 136 | 20 | 135.5 | 70.5 | 156.8 | 54.0 |
| | 136 | 60 | 137.3 | 49.5 | 58.7 | 29.4 |
| | 140 | 20 | 139.9 | 50.9 | 109.6 | 44.8 |
| | 140 | 60 | 139.9 | 1.8 | −0.4 | 1.0 |
| Sample 2 | 136 | 40 | 136.2 | 111.3 | −0.1 | 52.9 |
| Sample 1 | 128 | 30 | 128.1 | 148.9 | 3.6 | 72.4 |
| | 128 | 40 | 127.9 | 138.3 | 0.2 | 63.7 |
| | 128 | 60 | 127.9 | 141.0 | −0.6 | 62.1 |
| | 132 | 30 | 132.9 | 137.1 | 0.0 | 69.8 |
| | 132 | 60 | 131.8 | 125.2 | −0.3 | 60.6 |
| | 136 | 30 | 137.0 | 88.8 | 50.1 | 49.5 |
| | 136 | 60 | 135.9 | 28.0 | 15.5 | 19.9 |
| | 140 | 30 | 139.8 | 49.0 | 47.3 | 28.9 |
| | 140 | 60 | 140.4 | 20.4 | 19.0 | 11.9 |

TABLE 14B

Stress at Yield (20 mil)

| Material | Control Temperature (° C.) | Preheat Time (s) | Sheet Temperature (° C.) | Stress at Yield (psi) M | T | Eff |
|---|---|---|---|---|---|---|
| Sample 3 | 128 | 30 | 127.9 | 5.07 | 0.00 | 5.07 |
| | 128 | 30 | 127.8 | 6.28 | 8.51 | 7.66 |
| | 128 | 60 | 128.5 | 2.07 | 0.03 | 2.06 |
| | 132 | 30 | 133.8 | 3.85 | 2.78 | 4.11 |
| | 132 | 60 | 132.8 | 3.73 | 3.81 | 4.13 |
| | 136 | 20 | 135.5 | 5.96 | 7.14 | 6.63 |
| | 136 | 60 | 137.3 | 1.61 | 1.76 | 1.87 |
| | 140 | 20 | 139.9 | 2.63 | 4.13 | 3.67 |
| | 140 | 60 | 139.9 | 0.00 | 0.00 | 0.05 |
| Sample 2 | 136 | 40 | 136.2 | 2.94 | 0.00 | 2.95 |
| Sample 1 | 128 | 30 | 128.1 | 3.15 | 0.06 | 3.12 |
| | 128 | 40 | 127.9 | 1.67 | 0.00 | 1.67 |
| | 128 | 60 | 127.9 | 1.61 | 0.00 | 1.61 |
| | 132 | 30 | 132.9 | 2.13 | −0.01 | 2.13 |
| | 132 | 60 | 131.8 | 2.30 | −0.01 | 2.31 |
| | 136 | 30 | 137.0 | 3.05 | 1.53 | 3.13 |
| | 136 | 60 | 135.9 | 0.46 | 0.25 | 0.65 |
| | 140 | 30 | 139.8 | 2.34 | 1.58 | 2.38 |
| | 140 | 60 | 140.4 | 0.96 | 0.63 | 0.98 |

TABLE 14C

Ultimate Stress (20 mil)

| Material | Control Temperature (° C.) | Preheat Time (s) | Sheet Temperature (° C.) | Ultimate Stress (psi) M | T | Eff |
|---|---|---|---|---|---|---|
| Sample 3 | 128 | 30 | 127.9 | 11.54 | 15.15 | 13.70 |
| | 128 | 30 | 127.8 | 9.11 | 11.61 | 10.60 |
| | 128 | 60 | 128.5 | 7.08 | 8.55 | 7.95 |
| | 132 | 30 | 133.8 | 8.85 | 11.60 | 10.50 |
| | 132 | 60 | 132.8 | 7.01 | 9.85 | 8.79 |
| | 136 | 20 | 135.5 | 7.46 | 10.98 | 9.71 |
| | 136 | 60 | 137.3 | 3.08 | 4.02 | 3.64 |
| | 140 | 20 | 139.9 | 4.62 | 7.20 | 6.43 |
| | 140 | 60 | 139.9 | −0.07 | 0.00 | 0.12 |
| Sample 2 | 136 | 40 | 136.2 | 6.84 | 7.17 | 7.01 |
| Sample 1 | 128 | 30 | 128.1 | 9.31 | 10.97 | 10.25 |
| | 128 | 40 | 127.9 | 8.97 | 10.59 | 9.88 |
| | 128 | 60 | 127.9 | 7.91 | 9.66 | 8.92 |
| | 132 | 30 | 132.9 | 9.39 | 11.00 | 10.29 |
| | 132 | 60 | 131.8 | 7.43 | 7.32 | 7.45 |
| | 136 | 30 | 137.0 | 5.59 | 7.68 | 6.93 |
| | 136 | 60 | 135.9 | 1.59 | 1.64 | 1.86 |
| | 140 | 30 | 139.8 | 3.80 | 5.38 | 4.79 |
| | 140 | 60 | 140.4 | 1.73 | 2.15 | 2.13 |

TABLE 14D

Yield Peak Strain (20 mil)

| Material | Control Temperature (° C.) | Preheat Time (s) | Sheet Temperature (° C.) | Yield Peak Strain (%) M | T | Eff |
|---|---|---|---|---|---|---|
| Sample 3 | 128 | 30 | 127.9 | 31.84 | 31.75 | 63.58 |
| | 128 | 30 | 127.8 | 23.01 | 22.86 | 45.87 |
| | 128 | 60 | 128.5 | 22.04 | 21.90 | 43.93 |
| | 132 | 30 | 133.8 | 22.23 | 22.15 | 44.38 |
| | 132 | 60 | 132.8 | 18.79 | 18.66 | 37.45 |
| | 136 | 20 | 135.5 | 18.94 | 18.65 | 37.58 |
| | 136 | 60 | 137.3 | 8.05 | 8.00 | 16.05 |
| | 140 | 20 | 139.9 | 15.78 | 15.65 | 31.42 |
| | 140 | 60 | 139.9 | 0.81 | 0.65 | 1.46 |
| Sample 2 | 136 | 40 | 136.2 | 15.37 | 15.20 | 30.56 |
| Sample 1 | 128 | 30 | 128.1 | 21.94 | 21.79 | 43.72 |
| | 128 | 40 | 127.9 | 21.92 | 21.79 | 43.70 |
| | 128 | 60 | 127.9 | 20.96 | 20.96 | 41.90 |
| | 132 | 30 | 132.9 | 21.75 | 21.32 | 43.07 |
| | 132 | 60 | 131.8 | 12.72 | 12.50 | 25.22 |
| | 136 | 30 | 137.0 | 16.80 | 16.42 | 33.22 |
| | 136 | 60 | 135.9 | 6.87 | 6.70 | 13.57 |
| | 140 | 30 | 139.8 | 22.23 | 21.96 | 44.19 |
| | 140 | 60 | 140.4 | 9.34 | 9.24 | 18.58 |

To combine oven temperature and preheat time into a single average sheet temperature value, heat transfer modelling using Equation (4) (set forth above) was utilized. The parameter was manually optimized to h/ρc=2.25 by trial and error, based on the relationship with maximum effective stress. To illustrate the effect of combining temperature and preheat time into a single value, the maximum effective stress is plotted versus: controlled oven temperature in FIG. 10; measured surface temperature in FIG. 11; and estimated average sheet temperature in FIG. 12, which was calculated using Equation (4).

Figure 10:
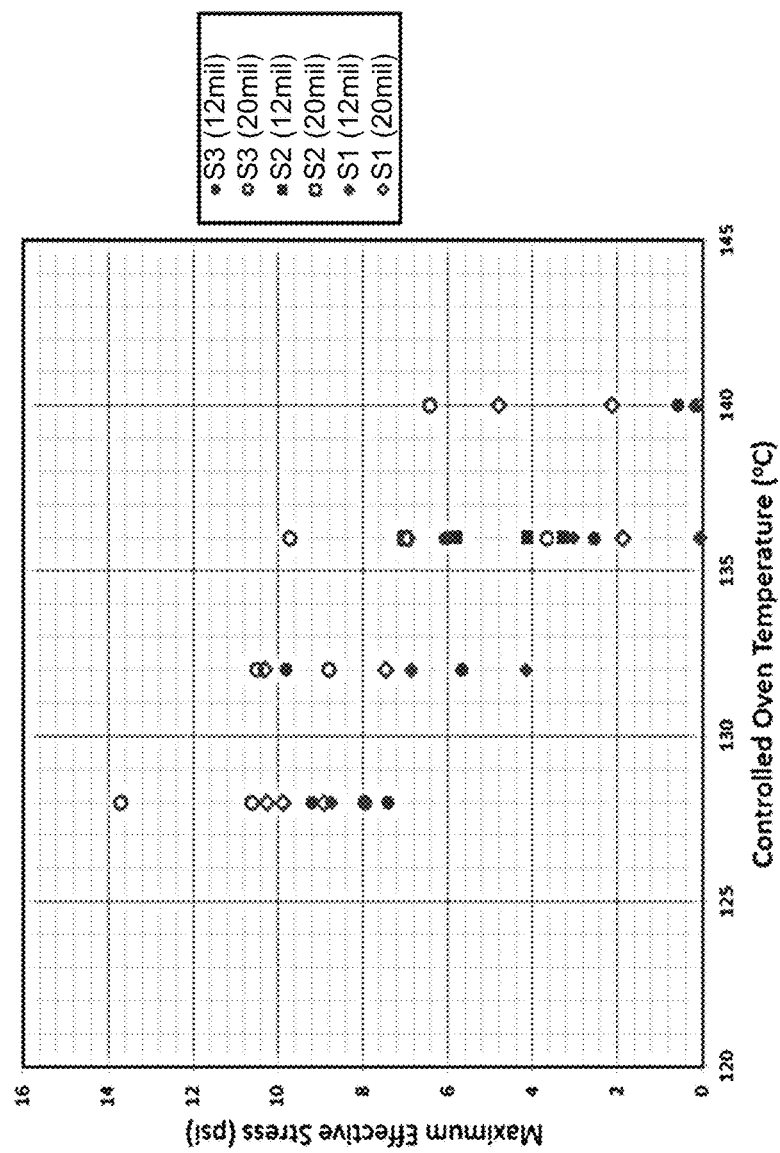
FIG. 10 is a graphical depiction of maximum effective stress versus controlled oven temperature for cast sheets in accordance with Example 5.
Figure 11:
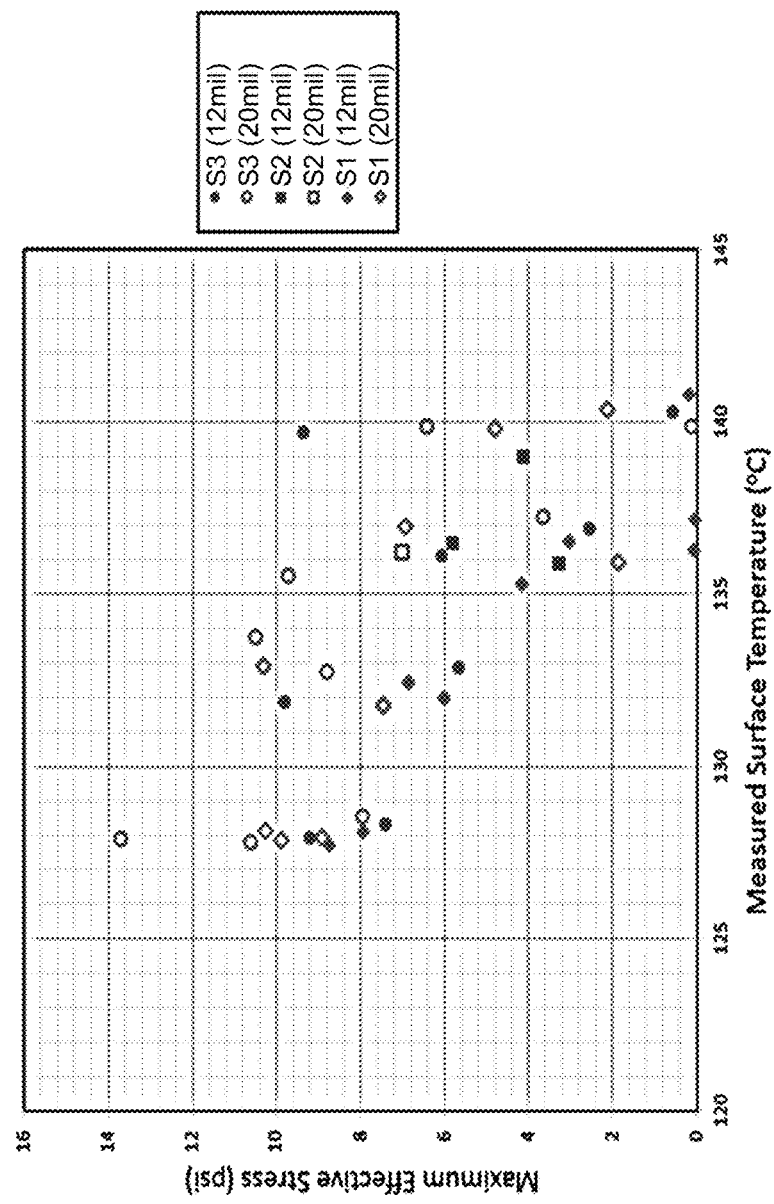
FIG. 11 is a graphical depiction of maximum effective stress versus measured surface temperature for cast sheets in accordance with Example 5.
Figure 12:
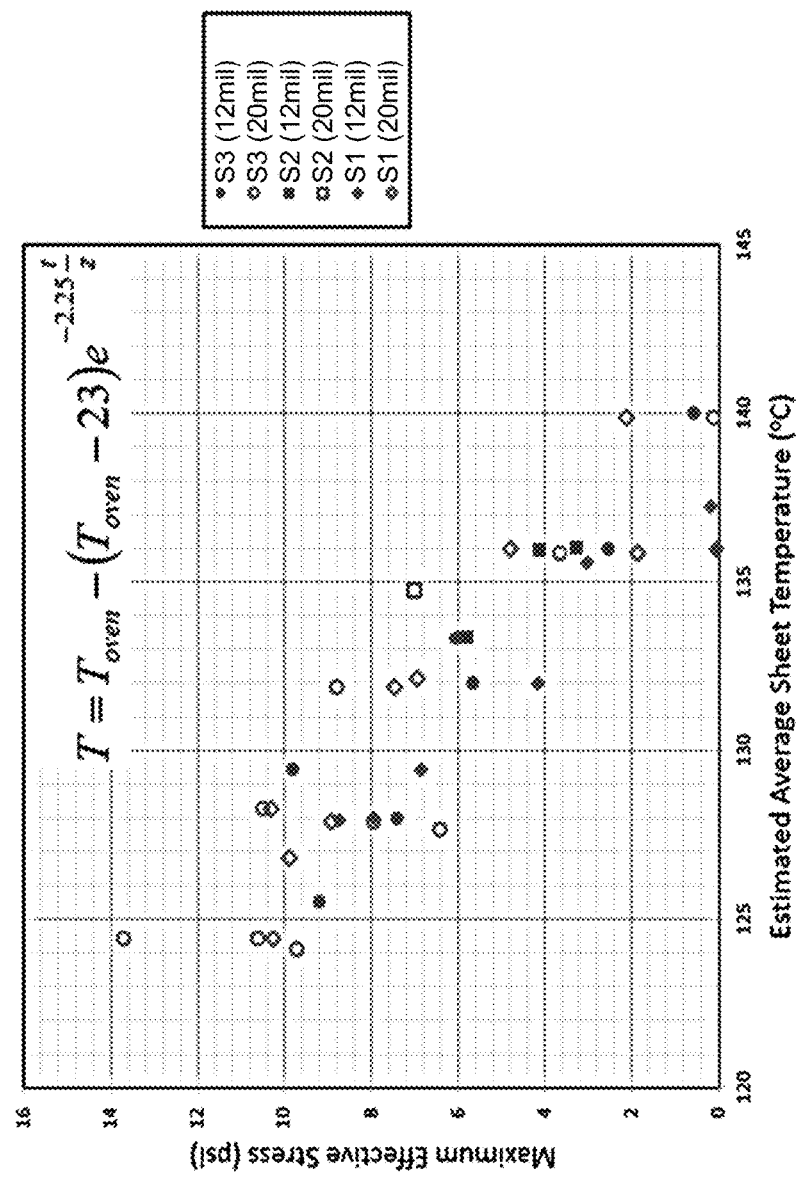
FIG. 12 is a graphical depiction of maximum effective stress versus estimated average sheet temperature for cast sheets in accordance with Example 5.

With reference to FIG. 10, a range in properties is possible at a single oven temperature, which may vary with both preheat time and cast sheet thickness. Thicker cast sheets tended to exhibit higher stress at equivalent temperatures/times. Similar results were observed in FIG. 11. Without being bound by theory, it is believed that heat transfer at the surface of the cast sheets occurs in relatively short time frame, and relatively small differences were observed at the more elevated temperatures and shortest preheat times tested. FIG. 12 exhibits data trending toward a linear relationship. The data observed during stretching was proportional to the resolved sheet temperature based on a combination of temperature, time, and thickness. Without being bound by theory, it is believed that the cast sheet pass-fail performance is driven by factors other than sheet temperature dependent properties (e.g., sheet defects, residual stress, and non-uniformity).

Example 6

Biaxial Stretching—Stretch Ratio and Strain Rate Variance

Cast sheet specimens of Samples 1-3 produced in accordance with Example 4 were subjected to biaxial stretching in a Bruckner Biaxial Stretcher. During the biaxial stretching of Example 6, the stretching temperature was maintained at 132° C. and the preheat wait time was maintained at 40 s. During the biaxial stretching of Example 6, the stretch ratio and strain rate were varied. In Example 6, the cast sheet specimens had a thickness of 16 mils. Stretching in Example 6 was conducted to find the largest strain rate that could be used while still successfully stretching the cast sheet specimens. After the largest strain rate that could be used to successfully stretch the cast sheet specimens was determined, it was assumed that smaller applied strain rates would also successfully stretch the cast sheet specimens. For example, if a 4×4 stretch ratio was successfully used in stretching, it was assumed that 2×2 and 3×3 stretch ratios would also be successful in stretching.

The pass-fail results obtained in Example 6 are presented in Tables 15A, 15B and 15C, below.

TABLE 15A

Sample 3
Material - Sample 3
Thickness - 16 mil
Oven Temperature - 132° C.
Preheat Time - 40 s

| | | Stress-Rate (%/s) | | | | | |
|---|---|---|---|---|---|---|---|
| | | 12 | 25 | 50 | 100 | 200 | 400 |
| Stretch Ratio MD × TD | 1.2 × 1.3 | >80% Pass | >80% Pass | >80% Pass | >80% Pass | <20% Pass | >80% Pass |
| | 1.5 × 1.5 | >80% Pass | >80% Pass | >80% Pass | 20-80% Pass | <20% Pass | >80% Pass |
| | 2 × 2 | >80% Pass | >80% Pass | >80% Pass | <20% Pass | <20% Pass | >80% Pass |
| | 3 × 3 | >80% Pass | 20-80% Pass | 20-80% Pass | 20-80% Pass | 20-80% Pass | <20% Pass |
| | 4 × 4 | 20-80% Pass | <20% Pass | <20% Pass | <20% Pass | <20% Pass | <20% Pass |

TABLE 15B

Sample 2
Material - Sample 2
Thickness - 16 mil
Oven Temperature - 132° C.
Preheat Time - 40 s

| | | Stress-Rate (%/s) | | | | | |
|---|---|---|---|---|---|---|---|
| | | 12 | 25 | 50 | 100 | 200 | 400 |
| Stretch Ratio MD × TD | 1.2 × 1.3 | >80% Pass | >80% Pass | >80% Pass | >80% Pass | >80% Pass | >80% Pass |
| | 1.5 × 1.5 | >80% Pass | >80% Pass | >80% Pass | >80% Pass | >80% Pass | >80% Pass |
| | 2 × 2 | >80% Pass | >80% Pass | >80% Pass | 20-80% Pass | >80% Pass | >80% Pass |
| | 3 × 3 | >80% Pass | >80% Pass | >80% Pass | <20% Pass | <20% Pass | <20% Pass |
| | 4 × 4 | >80% Pass | >80% Pass | >80% Pass | <20% Pass | <20% Pass | <20% Pass |

TABLE 15C

Sample 1
Material - Sample 1
Thickness - 16 mil
Oven Temperature - 132° C.
Preheat Time - 40 s

| | | Stress-Rate (%/s) | | | | | |
|---|---|---|---|---|---|---|---|
| | | 12 | 25 | 50 | 100 | 200 | 400 |
| Stretch Ratio MD × TD | 1.2 × 1.3 | Not tested | >80% Pass | >80% Pass | >80% Pass | >80% Pass | >80% Pass |
| | 1.5 × 1.5 | Not tested | >80% Pass | >80% Pass | >80% Pass | >80% Pass | >80% Pass |
| | 2 × 2 | Not tested | >80% Pass | >80% Pass | >80% Pass | >80% Pass | >80% Pass |
| | 3 × 3 | Not tested | >80% Pass | >80% Pass | >80% Pass | >80% Pass | >80% Pass |
| | 4 × 4 | <20% Pass | <20% Pass | <20% Pass | >80% Pass | <20% Pass | <20% Pass |

Sample 1 cast sheets were observed to be more successful at stretching at relatively faster strain rates (e.g., 100%/s and above), at up to 3×3 or 4×4 stretch ratios than Samples 2 and 3. The average data recorded during the stretching of Example 6 is summarized in Tables 16A, 16B, 16C and 16D, where only the tests resulting in a "Pass" are included.

TABLE 16A

Stiffness (16 mil)

| Material | Strain Rate (%) M, T | Stretch Ratio (—/—) M | Stretch Ratio (—/—) T | Sheet Temperature (° C.) | Stiffness (psi) M | T | Eff |
|---|---|---|---|---|---|---|---|
| Sample 3 | 6 | 3 | 3 | 131.7 | 22.4 | −7.1 | 13.7 |
|  | 12 | 4 | 4 | 131.7 | 5.3 | 29.6 | 20.2 |
|  | 25 | 2 | 2 | 131.9 | 26.7 | 76.8 | 42.7 |
|  | 25 | 3 | 3 | 132.0 | 69.3 | −1.9 | 33.4 |
|  | 50 | 3 | 3 | 133.3 | 68.3 | −1.2 | 32.4 |
|  | 100 | 3 | 3 | 131.9 | 8.7 | 8.5 | 7.9 |
|  | 200 | 3 | 3 | 131.7 | 16.9 | 15.0 | 7.5 |
|  | 200 | 3 | 3 | 131.7 | 16.9 | 15.0 | 7.5 |
|  | 400 | 2 | 2 | 131.8 | 10.4 | 22.1 | 7.5 |
| Sample 2 | 12 | 4 | 4 | 131.7 | 7.3 | −9.2 | 6.7 |
|  | 25 | 2 | 2 | 131.8 | 115.9 | 49.9 | 60.4 |
|  | 25 | 4 | 4 | 131.7 | 35.4 | 0.9 | 16.8 |
|  | 50 | 3 | 3 | 131.9 | 28.1 | 33.7 | 29.4 |
|  | 50 | 4 | 4 | 131.9 | 34.8 | 17.1 | 24.5 |
|  | 100 | 2 | 2 | 131.8 | 75.6 | 70.7 | 42.5 |
|  | 400 | 2 | 2 | 131.7 | 25.2 | 43.8 | 15.0 |
| Sample 1 | 25 | 3 | 3 | 132.1 | 11.7 | −1.2 | 6.2 |
|  | 50 | 2 | 2 | 131.3 | 92.7 | 68.0 | 44.9 |
|  | 50 | 3 | 3 | 131.8 | 1.3 | −0.4 | 0.7 |
|  | 100 | 3 | 3 | 131.9 | 16.1 | −0.5 | 5.9 |
|  | 100 | 4 | 4 | 131.9 | 31.4 | 6.5 | 13.2 |
|  | 200 | 2 | 2 | 131.7 | 81.3 | 83.9 | 39.1 |
|  | 200 | 3 | 3 | 131.9 | 20.0 | 13.2 | 9.1 |
|  | 400 | 3 | 3 | 131.9 | 10.9 | 9.8 | 5.5 |

TABLE 16B

Stress at Yield (16 mil)

| Material | Strain Rate (%) M, T | Stretch Ratio (—/—) M | Stretch Ratio (—/—) T | Sheet Temperature (° C.) | Stress at Yield (psi) M | T | Eff |
|---|---|---|---|---|---|---|---|
| Sample 3 | 6 | 3 | 3 | 131.7 | 0.07 | −0.01 | 0.07 |
|  | 12 | 4 | 4 | 131.7 | 0.02 | 0.23 | 0.30 |
|  | 25 | 2 | 2 | 131.9 | 0.46 | 0.71 | 0.91 |
|  | 25 | 3 | 3 | 132.0 | 0.95 | 0.01 | 0.95 |
|  | 50 | 3 | 3 | 133.3 | 1.02 | 0.00 | 1.02 |
|  | 100 | 3 | 3 | 131.9 | 0.15 | 0.18 | 0.39 |
|  | 200 | 3 | 3 | 131.7 | 0.84 | 0.78 | 0.85 |
|  | 200 | 3 | 3 | 131.7 | 0.84 | 0.78 | 0.85 |
|  | 400 | 2 | 2 | 131.8 | 1.68 | 1.94 | 1.84 |
| Sample 2 | 12 | 4 | 4 | 131.7 | 01.08 | −0.02 | 0.09 |
|  | 25 | 2 | 2 | 131.8 | 1.63 | 0.92 | 1.70 |
|  | 25 | 4 | 4 | 131.7 | 0.40 | 0.03 | 0.39 |
|  | 50 | 3 | 3 | 131.9 | 0.66 | 0.21 | 1.04 |
|  | 50 | 4 | 4 | 131.9 | 0.72 | 0.45 | 0.96 |
|  | 100 | 2 | 2 | 131.8 | 3.76 | 3.38 | 3.99 |
|  | 400 | 2 | 2 | 131.7 | 3.66 | 3.42 | 3.56 |
| Sample 1 | 25 | 3 | 3 | 132.1 | 0.14 | 0.00 | 0.14 |
|  | 50 | 2 | 2 | 131.3 | 2.29 | 1.50 | 2.14 |
|  | 50 | 3 | 3 | 131.8 | 0.06 | 0.00 | 0.06 |
|  | 100 | 3 | 3 | 131.9 | 0.48 | −0.46 | 0.82 |
|  | 100 | 4 | 4 | 131.9 | 0.67 | 0.20 | 0.63 |
|  | 200 | 2 | 2 | 131.7 | 5.89 | 4.35 | 5.35 |
|  | 200 | 3 | 3 | 131.9 | 0.90 | 0.59 | 0.79 |
|  | 400 | 3 | 3 | 131.9 | 1.46 | 1.49 | 1.48 |

TABLE 16C

Ultimate Stress (16 mil)

| Material | Strain Rate (%) M, T | Stretch Ratio (—/—) M | Stretch Ratio (—/—) T | Sheet Temperature (° C.) | Ultimate Stress (psi) M | T | Eff |
|---|---|---|---|---|---|---|---|
| Sample 3 | 6 | 3 | 3 | 131.7 | −0.92 | 0.68 | 1.38 |
|  | 12 | 4 | 4 | 131.7 | −0.27 | 1.66 | 1.85 |
|  | 25 | 2 | 2 | 131.9 | 2.63 | 4.62 | 4.12 |
|  | 25 | 3 | 3 | 132.0 | 0.85 | 4.47 | 4.12 |
|  | 50 | 3 | 3 | 133.3 | 3.83 | 7.85 | 6.83 |
|  | 100 | 3 | 3 | 131.9 | −0.41 | 2.44 | 2.71 |
|  | 200 | 3 | 3 | 131.7 | 0.83 | 1.55 | 2.91 |
|  | 200 | 3 | 3 | 131.7 | 0.83 | 1.55 | 2.91 |
|  | 400 | 2 | 2 | 131.8 | 3.15 | 2.31 | 2.96 |
| Sample 2 | 12 | 4 | 4 | 131.7 | 0.45 | 2.44 | 2.25 |
|  | 25 | 2 | 2 | 131.8 | 4.08 | 7.09 | 6.21 |
|  | 25 | 4 | 4 | 131.7 | 0.33 | 2.71 | 2.56 |
|  | 50 | 3 | 3 | 131.9 | 0.99 | 3.52 | 3.14 |
|  | 50 | 4 | 4 | 131.9 | 0.71 | 3.14 | 2.85 |
|  | 100 | 2 | 2 | 131.8 | 6.01 | 7.34 | 6.79 |
|  | 400 | 2 | 2 | 131.7 | 3.95 | 4.11 | 4.04 |
| Sample 1 | 25 | 3 | 3 | 132.1 | 1.87 | 4.40 | 3.88 |
|  | 50 | 2 | 2 | 131.3 | 5.12 | 6.42 | 5.89 |
|  | 50 | 3 | 3 | 131.8 | 0.06 | 0.17 | 0.31 |
|  | 100 | 3 | 3 | 131.9 | 1.02 | −0.36 | 1.24 |
|  | 100 | 4 | 4 | 131.9 | 0.87 | 1.67 | 1.45 |
|  | 200 | 2 | 2 | 131.7 | 7.82 | 7.06 | 7.51 |
|  | 200 | 3 | 3 | 131.9 | 1.91 | 0.16 | 1.85 |
|  | 400 | 3 | 3 | 131.9 | 1.59 | 1.82 | 1.72 |

TABLE 16D

Yield Peak Strain (16 mil)

| Material | Strain Rate (%) M, T | Stretch Ratio (—/—) M | Stretch Ratio (—/—) T | Sheet Temperature (° C.) | Yield Peak Strain (%) M | T | Eff |
|---|---|---|---|---|---|---|---|
| Sample 3 | 6 | 3 | 3 | 131.7 | 0.04 | 0.03 | 0.07 |
|  | 12 | 4 | 4 | 131.7 | 6.53 | 6.52 | 13.05 |
|  | 25 | 2 | 2 | 131.9 | 10.99 | 10.85 | 21.84 |
|  | 25 | 3 | 3 | 132.0 | 4.51 | 4.22 | 8.73 |
|  | 50 | 3 | 3 | 133.3 | 4.76 | 4.31 | 9.07 |
|  | 100 | 3 | 3 | 131.9 | 4.47 | 4.30 | 8.77 |
|  | 200 | 3 | 3 | 131.7 | 9.25 | 6.88 | 16.16 |
|  | 200 | 3 | 3 | 131.7 | 9.25 | 6.88 | 16.16 |
|  | 400 | 2 | 2 | 131.8 | 20.04 | 14.39 | 34.56 |
| Sample 2 | 12 | 4 | 4 | 131.7 | 1.69 | 1.66 | 3.34 |
|  | 25 | 2 | 2 | 131.8 | 13.62 | 13.41 | 27.03 |
|  | 25 | 4 | 4 | 131.7 | 5.59 | 5.36 | 10.95 |
|  | 50 | 3 | 3 | 131.9 | 9.08 | 8.71 | 17.80 |
|  | 50 | 4 | 4 | 131.9 | 10.03 | 9.59 | 19.62 |
|  | 100 | 2 | 2 | 131.8 | 18.34 | 17.43 | 35.78 |
|  | 400 | 2 | 2 | 131.7 | 22.54 | 16.93 | 39.58 |
| Sample 1 | 25 | 3 | 3 | 132.1 | 2.56 | 2.39 | 4.95 |
|  | 50 | 2 | 2 | 131.3 | 13.35 | 12.98 | 26.32 |
|  | 50 | 3 | 3 | 131.8 | 1.11 | 1.08 | 2.18 |
|  | 100 | 3 | 3 | 131.9 | 6.61 | 6.77 | 13.37 |
|  | 100 | 4 | 4 | 131.9 | 7.53 | 7.62 | 15.14 |
|  | 200 | 2 | 2 | 131.7 | 15.61 | 13.62 | 29.25 |
|  | 200 | 3 | 3 | 131.9 | 7.74 | 5.91 | 13.68 |
|  | 400 | 3 | 3 | 131.9 | 22.72 | 16.92 | 39.77 |

Figure 13:
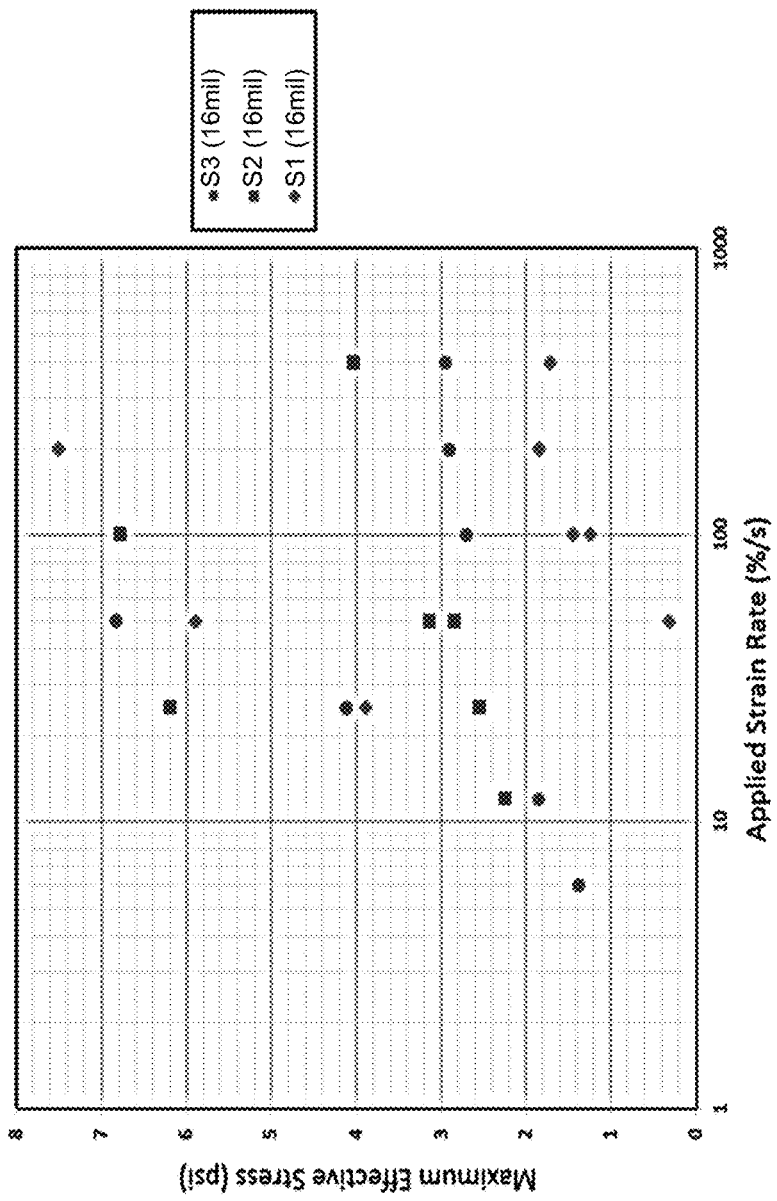
FIG. 13 is a graphical depiction of maximum effective stress versus applied strain rate for cast sheets in accordance with Example 6.

The maximum effective stress determined in Example 6 is plotted versus the applied strain-rate in FIG. 13. From the data plotted in FIG. 13, Sample 1 exhibited the lowest stresses. Without being bound by theory, this is believed to be a consequence of easier stretching of Sample 1 at relatively fast strain rates.

CONCLUSIONS

Sample 1 exhibited strain hardening during tensile testing at room temperature. Strain hardening during tensile testing at room temperature allows a resin (e.g., Sample 1) to deform more uniformly during thermoforming stretching.

Sample 1 exhibited a superior capability of being stretched at rates of 50%/s and above and at relatively high stretch ratios (e.g., 3×3 and 4×4 vs. 2×2) in comparison to Samples 2 and 3.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A method comprising:
   melt extruding a polyethylene comprising a rheological breadth parameter of from 0.20 to 0.40, a bimodal molecular weight distribution, a weight average molecular weight of between 100,000 and 110,000 g/mol, a Mz/Mw of between 7 to 8, and a peak molecular weight (Mp) of from 20,000 g/mol to 35,000 g/mol, and a polydispersity (Mw/Mn) of from 8 to 12 to form an extruded sheet, wherein the rheological breadth parameter of the polyethylene changes by no more than about 5% after extrusion relative to the rheological breadth parameter of the polyethylene prior to extrusion;
   thermoforming the extruded sheet within a mold to form a thermoformed article, wherein, during the thermoforming of the extruded sheet, the extruded sheet is subjected to solid-state stretching in one or more directions; and
   retrieving the thermoformed article from the mold.

2. The method of claim 1, wherein the polyethylene is a high density polyethylene (HDPE) comprising a density ranging from 0.940 to 0.970 g/cc, as determined in accordance with ASTM D792.

3. The method of claim 1, wherein the polyethylene comprises a zero shear viscosity of from 1000 Pa·sec to 50000 Pa·sec.

4. The method of claim 1, wherein the polyethylene comprises a relaxation time of from 0.001 seconds to 0.1 seconds.

5. The method of claim 1, wherein the polyethylene comprises an activation energy ($E_a$) of from 20 to 30 kJ/mol.

6. The method of claim 1, wherein the polyethylene comprises a high load melt index (HLMI) that is greater than 50g/10 min, as determined in accordance with ASTM-D-1238, at 190° C. and a load of 21.6 kg.

7. The method of claim 1, wherein the polyethylene comprises an $MI_2$ of from 0.5 to 8.0 dg/min., as determined by ASTM D-1238 at 190° C. and a load of 2.16 kg.

8. The method of claim 1, wherein the polyethylene comprises a number average molecular weight (Mn) of between 1,000 and 30,000 g/mol, as determined by gel permeation chromatography (GPC).

9. The method of claim 1, wherein the polyethylene comprises a z-average molecular weight (Mz) of between 500,000 and 3,000,000 g/mol, as determined by gel permeation chromatography (GPC).

10. The method of claim 1, wherein the polyethylene comprises a crystallization temperature of from about 100° C. to 135° C., as determined by Differential Scanning Calorimetry (DSC) in accordance with ASTM D-3418D.

11. The method of claim 1, wherein the polyethylene comprises a crystallization enthalpy of from 170 to 215 J/g, as determined by Differential Scanning Calorimetry (DSC) in accordance with ASTM D-3418D.

12. The method of claim 1, wherein the polyethylene comprises a shear response that is greater than 40, as determined in accordance with ASTM D-3518.

13. The method of claim 1, wherein the polyethylene comprises a tensile modulus of from 160,000 to 220,000 psi, as determined in accordance with ASTM D638.

14. The method of claim 1, wherein the polyethylene comprises a tensile strength at yield ranging from 3500 to 5000 psi, as determined in accordance with ASTM D638.

15. The method of claim 1, wherein the polyethylene comprises a tensile strength at break of greater than 3000 psi, as determined in accordance with ASTM D638.

16. The method of claim 1, wherein the polyethylene comprises an elongation at yield ranging from 3 to 10%, as determined in accordance with ASTM D638.

17. The method of claim 1, wherein the polyethylene comprises an Environmental Stress Crack Resistance (ESCR) that is greater than 30 hours, as determined in accordance with ASTM D-1693 Condition B, F50.

18. The method of claim 1, wherein the polyethylene comprises a yellowness index of less than 1, a Color L of from 60 to 90, a Color a of less than 2, and a Color b of less than 2, each determined in accordance with ASTM D-6290.

19. The method of claim 1, wherein the polyethylene comprises strain-hardening.

20. The method of claim 1, wherein the extruded sheet is a monolayer extruded sheet or a multilayer extruded sheet.

21. The method of claim 1, wherein the polyethylene comprises one or more additives selected from nucleators, clarifiers, antioxidants, colorants, UV absorbers, stabilizers, and processing aids.

22. A method comprising:
   melt extruding a HDPE that comprises a bimodal molecular weight distribution, a density ranging from 0.958-0.959 g/cc as determined in accordance with ASTM D792, a weight average molecular weight of between 100,000 and 110,000 g/mol, a polydispersity (Mw/Mn) of between 8 and 12, a Mz/Mw of between 7 to 8, and a peak molecular weight (Mp) of from 20,000g/mol to 35,000 g/mol, and tensile strain-hardening to form an extruded sheet;
   thermoforming the extruded sheet within a mold to form a thermoformed article, wherein, during the thermoforming of the extruded sheet, the extruded sheet is subjected to solid-state stretching in one or more directions; and
   retrieving the thermoformed article from the mold.

23. A method comprising:
   melt extruding a polyethylene comprising a rheological breadth parameter of from 0.20 to 0.40, bimodal molecular weight distribution, a weight average molecular weight of between 100,000 and 110,000 g/mol, a Mz/Mw of between 7 to 8, and a peak molecular weight (Mp) of from 20,000 g/mol to 35,000 g/mol, and a polydispersity (Mw/Mn) of from 8 to 12, and a density ranging from 0.958-0.959 g/cc as determined in accordance with ASTM D792 to form an extruded sheet, wherein the rheological breadth parameter of the polyethylene changes by no more than about 5% after extrusion relative to the rheological breadth parameter of the polyethylene prior to extrusion;

thermoforming the extruded sheet within a mold to form a thermoformed article, wherein, during the thermoforming of the extruded sheet, the extruded sheet is subjected to solid-state stretching in one or more directions; and retrieving the thermoformed article from the mold.

* * * * *